(12) United States Patent
Caudle et al.

(10) Patent No.: US 12,163,455 B2
(45) Date of Patent: Dec. 10, 2024

(54) CATALYST WITH MAGNETIC FERRITE SUPPORT MATERIAL

(71) Applicant: BASF MOBILE EMISSIONS CATALYSTS LLC, Iselin, NJ (US)

(72) Inventors: Matthew T. Caudle, Hamilton, NJ (US); Stanley A. Roth, Yardley, PA (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 18/032,839

(22) PCT Filed: Oct. 22, 2021

(86) PCT No.: PCT/US2021/071982
§ 371 (c)(1),
(2) Date: Apr. 20, 2023

(87) PCT Pub. No.: WO2022/094531
PCT Pub. Date: May 5, 2022

(65) Prior Publication Data
US 2024/0060441 A1    Feb. 22, 2024

Related U.S. Application Data

(60) Provisional application No. 63/105,466, filed on Oct. 26, 2020.

(51) Int. Cl.
*F01N 3/28* (2006.01)
*B01D 53/94* (2006.01)
(Continued)

(52) U.S. Cl.
CPC ....... *F01N 3/2828* (2013.01); *B01D 53/9436* (2013.01); *B01J 23/42* (2013.01);
(Continued)

(58) Field of Classification Search
CPC ........ F01N 3/027; F01N 3/035; F01N 3/2026; F01N 13/009; F01N 13/0097;
(Continued)

(56) References Cited

U.S. PATENT DOCUMENTS 8,292,987 B2    10/2012    Gonze et al.
8,479,496 B2    7/2013    Gonze et al.
(Continued)

FOREIGN PATENT DOCUMENTS

JP    H11-336534 A    12/1999
JP    2005-230780 A    9/2005
(Continued)

OTHER PUBLICATIONS

International Search Report for PCT Patent Application No. PCT/US2021/071982, Issued on Feb. 15, 2022, 4 pages.

*Primary Examiner* — Anthony Ayala Delgado
(74) *Attorney, Agent, or Firm* — DLA Piper LLP (US)

(57) ABSTRACT

The present disclosure provides a catalyst composition comprising a catalytically active platinum group metal (PGM) component disposed on or impregnated in a magnetic ferrite support material, wherein the magnetic ferrite support material is capable of inductive heating in response to an applied alternating electromagnetic field. Further provided are catalyst articles comprising such compositions, and components comprising such catalyst articles, and further comprising a conductor associated with the catalyst article for receiving current and generating an alternating electromagnetic field in response thereto, wherein the conductor is positioned such that the generated alternating electromagnetic field is applied to at least a portion of the catalyst composition, inductively heating the catalyst composition directly at the catalytic site. Also provided are exhaust gas treatment systems including such components and/or articles, and meth- (Continued)

ods of treating emissions utilizing such components and systems.

15 Claims, 14 Drawing Sheets

(51) Int. Cl.
| | |
|---|---|
| *B01J 23/42* | (2006.01) |
| *B01J 23/80* | (2006.01) |
| *B01J 23/83* | (2006.01) |
| *B01J 23/89* | (2006.01) |
| *B01J 35/33* | (2024.01) |
| *B01J 35/40* | (2024.01) |
| *B01J 35/56* | (2024.01) |
| *B01J 35/61* | (2024.01) |
| *B01J 37/02* | (2006.01) |
| *F01N 3/035* | (2006.01) |
| *F01N 3/10* | (2006.01) |
| *F01N 3/20* | (2006.01) |
| *H05B 6/10* | (2006.01) |

(52) U.S. Cl.
CPC ............... *B01J 23/80* (2013.01); *B01J 23/83* (2013.01); *B01J 23/8953* (2013.01); *B01J 35/33* (2024.01); *B01J 35/40* (2024.01); *B01J 35/56* (2024.01); *B01J 35/612* (2024.01); *B01J 35/613* (2024.01); *B01J 37/0201* (2013.01); *F01N 3/035* (2013.01); *F01N 3/101* (2013.01); *F01N 3/106* (2013.01); *F01N 3/2026* (2013.01); *H05B 6/108* (2013.01); *B01D 2255/1021* (2013.01); *B01D 2255/9155* (2013.01); *B01D 2255/9202* (2013.01); *B01D 2255/9207* (2013.01); *B01D 2257/406* (2013.01); *B01D 2258/012* (2013.01); *F01N 2330/06* (2013.01); *F01N 2370/04* (2013.01); *F01N 2510/068* (2013.01)

(58) Field of Classification Search
CPC ...... F01N 2510/06; F01N 3/103; F01N 3/106; F01N 3/2013; F01N 13/0093; F01N 2240/16; F01N 2330/02; F01N 2330/06; F01N 2470/24; F01N 2510/10; F01N 2530/04; F01N 2560/025; F01N 2560/026; F01N 2560/06; F01N 2560/14; F01N 2610/02; F01N 3/10; F01N 3/101; F01N 3/105; F01N 3/2006; F01N 3/2066; F01N 3/281; F01N 3/2828; F01N 3/2853; F01N 3/2871; F01N 3/30; F01N 9/002; B01D 2255/2073; B01D 2255/20738; B01D 2255/20761; B01D 2255/50; B01D 2258/012; B01D 53/944; B01D 53/945; B01D 39/00; B01D 53/9477; B01J 21/04; B01J 21/12; B01J 23/42; B01J 23/44; B01J 23/46; B01J 23/468; B01J 23/75; B01J 27/185; B01J 27/1853
See application file for complete search history.

(56) References Cited

U.S. PATENT DOCUMENTS

| | | | |
|---|---|---|---|
| 11,697,110 B2* | 7/2023 | Yang | ........................ B01J 23/83 423/213.2 |
| 2011/0072805 A1 | 3/2011 | Horner et al. | |
| 2014/0033688 A1 | 2/2014 | Yoshioka | |
| 2015/0087497 A1 | 3/2015 | Chiffey et al. | |
| 2018/0094561 A1 | 4/2018 | Chang et al. | |
| 2019/0070596 A1* | 3/2019 | Yang | ........................ B01J 23/83 |

FOREIGN PATENT DOCUMENTS

| | | |
|---|---|---|
| JP | 6438819 B2 | 12/2018 |
| KR | 101274468 B1 | 6/2013 |
| WO | 2016/070090 A1 | 5/2016 |

\* cited by examiner

CATALYST WITH MAGNETIC FERRITE SUPPORT MATERIAL

This application is a National Stage application of PCT/US2021/071982, filed Oct. 22, 2021 which claims the benefit of priority of U.S. Provisional Patent Application No. 63/105,466, filed Oct. 26, 2020, the contents of which are incorporated by reference herein in their entirety.

The present disclosure relates generally to the field of exhaust gas treatment catalyst compositions, and to articles and systems including such compositions.

Operation of a lean-burn engine, for example, a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. Similarly, gasoline engines emit exhaust gas emissions containing HC, CO, and $NO_x$. Accordingly, exhaust gas streams of internal combustion engines require treatment in order to address such pollutants. As world-wide emissions standards become ever more stringent, there is a continuing need to improve catalytic systems employed for these purposes.

Lean burn (e.g., diesel) engine exhaust is generally treated with a series of catalysts configured for oxidation and reduction of various exhaust gas components. Catalysts containing platinum group metals (PGM) are useful in treating the exhaust of diesel engines to convert hydrocarbon and carbon monoxide by catalyzing the oxidation of these pollutants to carbon dioxide and water. In addition, oxidation catalysts that contain platinum promote the oxidation of NO to $NO_2$. For heavy-duty diesel systems, such catalysts are generally contained within regeneration diesel oxidation catalyst (DOC) systems, catalyst soot filter (CSF) systems, or combined DOC-CSF systems. These catalyst systems are placed in the exhaust flow path from diesel power systems to treat the resulting exhaust before it vents to the atmosphere. Typically, DOC or CSF catalysts comprise one or more PGMs such as palladium and/or platinum impregnated on a metal oxide support such as alumina, and optionally promoters and/or stabilizers, deposited on ceramic or metallic substrates, and typically provide oxidation of both hydrocarbons and carbon monoxide.

$NO_x$ components, including $NO_2$ formed by a DOC, must then be removed from the exhaust stream, typically by reducing $NO_x$ components with a suitable reductant in the presence of a selective catalytic reduction (SCR) catalyst. An SCR catalyst is adapted for catalytic reduction of nitrogen oxides with a reductant in the presence of an appropriate amount of oxygen. Reductants may be, for example, hydrocarbon, hydrogen, and/or ammonia. SCR catalysts typically comprise a molecular sieve (e.g., a zeolite) ion-exchanged with a promoter metal, such as copper or iron. The SCR process using ammonia in the presence of atmospheric oxygen results in the formation predominantly of nitrogen and steam according to the following equations:

   (standard SCR reaction)

   (slow SCR reaction)

   (fast SCR reaction)

Generally, diesel exhaust systems contain at least one such SCR catalyst.

In light and medium-duty applications, the system may contain a lean $NO_x$ trap (LNT) which serves to store and reduce $NO_x$, as well as remove carbon monoxide and unburned hydrocarbons from the exhaust stream. LNTs generally contain one or more PGM components impregnated on a support and NOx trapping components (e.g., ceria and/or alkaline earth metal oxides). An LINT catalyst is capable of adsorbing NOx under lean conditions and reducing the stored NOx to nitrogen under rich conditions.

An ammonia oxidation catalyst (AMOx) is frequently used downstream from an SCR to remove excess ammonia from the exhaust stream by oxidation. AMOx catalysts contain one or more metals suitable to convert ammonia, generally supported on a support material, such as alumina or titanic. An exemplary AMOx catalyst comprises a copper zeolite in conjunction with a supported platinum group metal (e.g., platinum impregnated on alumina).

Conventional gasoline engines having electronic fuel injection and air intake systems provide a constantly varying air-fuel mixture that quickly and continually cycles between lean and rich exhaust. Exhaust gas from vehicles powered by gasoline engines operated at or near stoichiometric air/fuel conditions is typically treated with a Three-way catalyst (TWC), which is effective to abate nitrogen oxides ($NO_x$), carbon monoxide (CO), and hydrocarbon (HC) pollutants in the exhaust. Typically, a TWC catalyst comprises one or more platinum group metals such as palladium and/or rhodium and optionally platinum, and an oxygen storage component.

A major problem encountered in the treatment of all automotive exhaust gas streams is the so-called "cold start" period, which is the time period at the beginning of the treatment process when the exhaust gas stream and the exhaust gas treatment system are at low temperatures (i.e., below 150° C.). At these low temperatures, exhaust gas treatment systems generally do not display sufficient catalytic activity for effectively treating HC, NOR, and/or CO emissions. This is particularly true for the downstream catalyst components, especially those placed after a high-thermal mass filter, such as an SCR catalyst, which can take several minutes to reach a suitable operating temperature.

To overcome the reduced catalyst activity during the cold start period, use of electric heating of a catalyst article during start-up conditions has been suggested. See, for example, US Pat. Publ. Nos. US2011/0072805 to Horner et al.; US2014/0033688 to Yoshioka, and US2015/0087497 to Chitley et al., as well as U.S. Pat. No. 8,292,987 to Grapes et al. and U.S. Pat. No. 8,479,496 to Gonze et al. In a typical approach, the heat is generated by the electric heater, e.g., with electric wires wrapped outside the catalyst substrate or a metallic substrate itself serving as the heating element. Several challenges to successful commercialization of such systems exist, including the relatively high energy consumption and the relatively low heating efficiency due to the need to first heat the catalyst substrate. In addition, most electric heating designs in the art use metallic substrates and are not compatible with the more widely-adopted ceramic substrates used as catalyst carriers in many systems. Accordingly, there is a continuing need in the art to develop catalyst components and systems for reducing tailpipe emissions of gaseous pollutants from gasoline or diesel engines, particularly breakthrough emissions that occur during cold start of the engine.

The present disclosure generally provides a catalyst composition comprising a catalytically active metal and a magnetic ceramic support material capable of inductive heating in response to an applied alternating electromagnetic field.

The disclosed subject matter can be used to directly heat the catalytic material at the active site, rapidly increasing the catalytic activity of the catalyst composition. Inductively heating the catalyst composition is particularly useful in enhancing catalytic activity when the catalyst temperature is below that required for effectively treating HC, $NO_x$, and/or CO emissions, such as during the cold-start period.

Accordingly, in one aspect is provided a catalyst composition comprising: a catalytically active platinum group metal (PGM) component, and a magnetic ferrite support material, the magnetic ferrite support material capable of inductive heating in response to an applied alternating magnetic field, wherein the active platinum group metal is disposed or impregnated on the magnetic ferrite support material.

In some embodiments, the magnetic ferrite support material comprises iron, and one or more elements chosen from (e.g., selected from the group consisting of) zinc, cobalt, nickel, yttrium, manganese, copper, barium, strontium, scandium, and lanthanum. In some embodiments, the magnetic ferrite support material comprises iron, and one or more elements chosen from (e.g., selected from the group consisting of) zinc, cobalt, nickel, and yttrium. In some embodiments, the magnetic ferrite support material comprises iron, nickel, and zinc. In some embodiments, a nickel/zinc molar ratio of the magnetic ferrite support material is from about 1/99 to about 99/1. In some embodiments, the nickel/zinc molar ratio is from about 25/75 to about 75/25. In some embodiments, the nickel/zinc molar ratio is about 50/50. In some embodiments, the magnetic ferrite support material has the molecular formula $Ni_{0.5}Zn_{0.5}Fe_2O_4$.

In some embodiments, the magnetic ferrite support material comprises iron, cobalt, and zinc. In some embodiments, a cobalt/zinc molar ratio of the magnetic ferrite support material is from about 1/99 to about 99/1. In some embodiments, the cobalt/zinc molar ratio is from about 25/75 to about 75/25. In some embodiments, the cobalt/zinc molar ratio is about 50/50. In some embodiments, the magnetic ferrite support material has the molecular formula $Co_{0.5}Zn_{0.5}Fe_2O_4$.

In some embodiments, the magnetic ferrite support material comprises iron and yttrium. In some embodiments, the magnetic ferrite support material has the molecular formula $Y_3Fe_5O_{12}$.

In some embodiments, the magnetic ferrite support material is calcined at a temperature of about 400° C. to about 1200° C. for about an hour or more. In some embodiments, the magnetic ferrite support material is calcined at a temperature of about 600° C. to about 900° C. for about an hour or more.

In some embodiments, the magnetic ferrite support material is in the form of particles having an average particle size from about 40 nm to about 1 μm. In some embodiments, the magnetic ferrite support material is the form of nanoparticles.

In some embodiments, the magnetic ferrite support material has a Brunauer-Emmett-Teller (BET) surface area of less than about 100 m²/g.

In some embodiments, the magnetic ferrite support material has a coercivity of the magnetic ferrite support material is from about 1 to about 20 kA/m.

In some embodiments, a temperature of the catalyst composition is increased by exposure to an alternating magnetic field.

In some embodiments, the PGM component is platinum, palladium, rhodium, or a combination thereof.

In some embodiments, the catalyst composition is configured as a diesel oxidation catalyst (DOC), a catalyzed soot filter (CSF) catalyst, a lean NOx trap (LNT) catalyst, an ammonia oxidation (AMOx) catalyst, or a three-way catalyst (TWC).

In another aspect is provided a catalytic article for treatment of exhaust gas emissions from an internal combustion engine, the catalytic article comprising: a substrate in the form of a flow-through substrate or wall-flow filter having the catalyst composition as disclosed herein deposited thereon. In some embodiments, the catalytic article is adapted for use as a diesel oxidation catalyst (DOC), catalyzed soot filter (CSF), lean NOx trap (LNT), selective catalytic reduction (SCR) catalyst, ammonia oxidation (AMOx) catalyst, or three-way catalyst (TWC). In some embodiments, the catalytic article is configured as a diesel oxidation catalyst (DOC) article.

In yet another aspect is provided an emission control system comprising the catalytic article as disclosed herein; and a conductor for receiving current and generating an alternating magnetic field in response thereto, the conductor positioned such that the generated alternating magnetic field is applied to at least a portion of the catalyst composition.

In some embodiments, the conductor is in the form of a coil of conductive wire surrounding at least a portion of the catalytic article.

In some embodiments, the emission control system further comprises an electric power source electrically connected to the conductor for supplying alternating current thereto.

In some embodiments, the emission control system further comprises: a temperature sensor positioned to measure a temperature of gases entering the catalytic article; and a controller in communication with the temperature sensor, the controller adapted for control of the current supplied to the conductor, such that the controller energizes the conductor with current when heating of the catalytic article is desired.

In a further aspect is provided a method of treating exhaust gas emissions from an internal combustion engine, comprising passing the exhaust gas emissions through the emission control system as disclosed herein. In some embodiments, the internal combustion engine is a gasoline engine, diesel engine, hybrid electric, or natural gas engine.

In a still further aspect is provided a catalyst for fixed bed reactor design comprising a catalyst bed having a catalyst composition, the catalyst composition comprising: a catalytic material; and at least one magnetic component, wherein the magnetic component comprises at least one magnetic ferrite support material.

In another aspect is provided a fixed bed catalyst system comprising: the catalyst as disclosed herein; and a conductor for receiving current and generating an alternating magnetic field in response thereto, the conductor positioned such that the generated alternating magnetic field is applied to at least a portion of the catalyst composition.

In yet a further aspect is provided a method for producing a catalytic material, the method comprising: heating a magnetic ferrite support material at a temperature of about 600° C. or greater for about an hour or more; and combining the heated magnetic ferrite support material with a catalytic material.

In yet another aspect is provided a method for producing a catalytic material, the method comprising: heating a magnetic ferrite support material for a time and at a temperature sufficient to decrease a Brunauer-Emmett-Teller (BET) surface area of the magnetic ferrite support material to less than about 100 m²/g; and combining the heated ferrite support material with a catalytic material.

These and other features, aspects, and advantages of the disclosure will be apparent from a reading of the following detailed description together with the accompanying drawings, which are briefly described below. Other aspects and advantages of the disclosed subject matter will become apparent from the following.

BRIEF DESCRIPTION OF THE DRAWINGS

In order to provide an understanding of embodiments of the disclosure, reference is made to the appended drawings, in which reference numerals refer to components of exemplary embodiments of the disclosed subject matter. The drawings are exemplary only, and should not be construed as limiting the disclosure. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

Figure 1A:
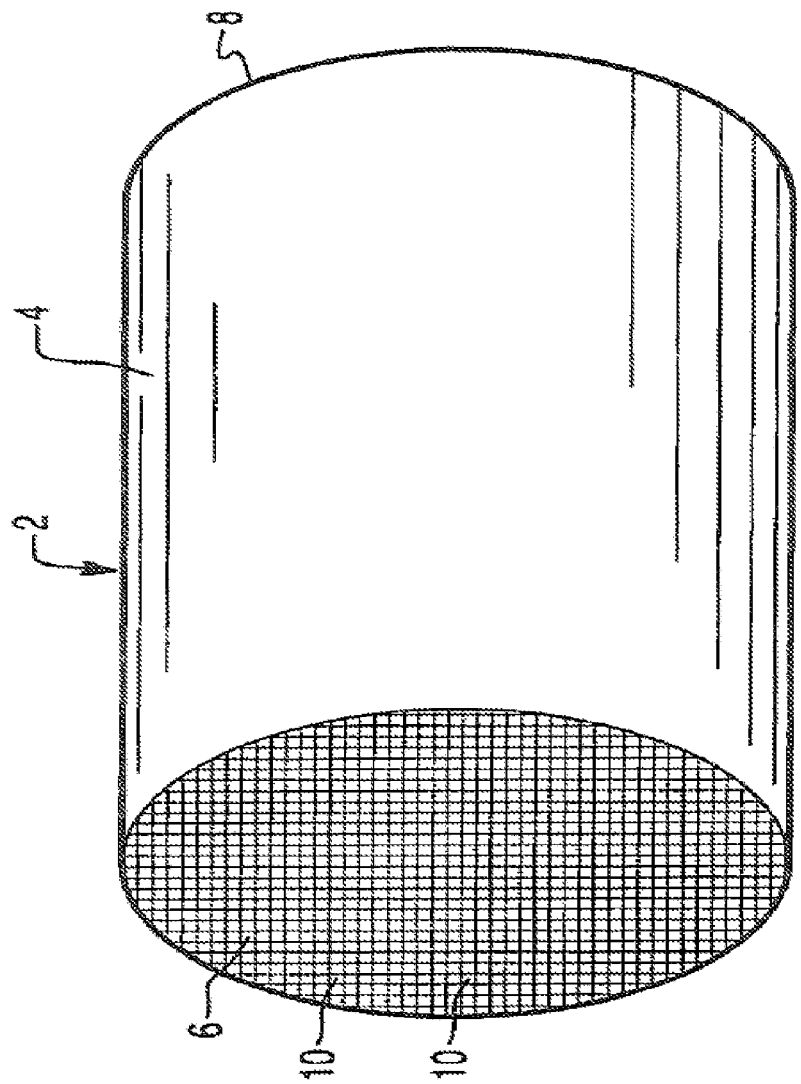
FIG. 1A is a perspective view of a honeycomb-type substrate which may comprise an oxidation catalyst composition in accordance with the present disclosure.

The present disclosure generally provides a catalyst composition comprising a catalytically active metal and a magnetic ceramic support material capable of inductive heating in response to an applied alternating electromagnetic field. Such catalyst compositions and articles comprising them are particularly useful in overcoming the reduced catalytic efficiency associated with low catalyst temperatures, such as those occurring during a cold start period or prolonged engine operation under low load (e.g., idle or extended low speed driving).

Accordingly, in one aspect is provided a catalyst composition comprising a catalytically active platinum group metal (PGM) component disposed on or impregnated in a magnetic ferrite support material, wherein the magnetic ferrite support material is capable of inductive heating in response to an applied alternating electromagnetic field.

The present disclosure now will be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. It will be readily apparent to one of ordinary skill in the relevant arts that suitable modifications and adaptations to the compositions, methods, and applications described herein can be made without departing from the scope of any embodiments or aspects thereof.

The compositions and methods provided are exemplary and are not intended to limit the scope of the claimed embodiments. Therefore, it is to be understood that the disclosure is not to be limited to the specific embodiments disclosed and that modifications and other embodiments are intended to be included within the scope of the appended claims. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All of the various embodiments, aspects, and options disclosed herein can be combined in all variations. The scope of the compositions, formulations, methods, and processes described herein include all actual or potential combinations of embodiments, aspects, options, examples, and preferences herein. Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of phrases such as "in one or more embodiments," "in certain embodiments," "in one embodiment," or "in an embodiment" in various places throughout this specification are not necessarily referring to the same embodiment of the disclosure. Furthermore, the particular features, structures, materials, or characteristics may be combined in any suitable manner in one or more embodiments. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed subject matter, in any of its various aspects and embodiments, should be viewed as intended to be combinable unless the context clearly dictates otherwise All methods described herein can be performed in any suitable order unless otherwise indicated herein or otherwise clearly contradicted by context. All patents and publications cited herein are incorporated by reference herein for the specific teachings thereof as noted, unless other specific statements of incorporation are specifically provided.

Definitions

With respect to the terms used in this disclosure, the following definitions are provided.

The articles "a" and "an" herein refer to one or to more than one (e.g., at least one) of the grammatical object.

Any ranges cited herein are inclusive.

The term "about" used throughout is used to describe and account for small fluctuations. For instance, "about" may mean the numeric value may be modified by ±5%, ±4%, ±3%, ±2%, ±1%, ±0.5%, ±0.4%, ±0.2%, ±0.1% or ±0.05%. All numeric values are modified by the term "about" whether or not explicitly indicated. Numeric values modified by the term "about" include the specific identified value. For example, "about 5.0" includes 5.0.

Recitation of ranges of values herein are merely intended to serve as a shorthand method of referring individually to each separate value falling within the range, unless otherwise indicated herein, and each separate value is incorporated into the specification as if it were individually recited herein.

The term "abatement" means a decrease in the amount, caused by any means.

"AMOx" refers to a selective ammonia oxidation catalyst, which is a catalyst containing one or more metals (typically Pt, although not limited thereto) and an SCR catalyst suitable to convert ammonia to nitrogen.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance, through one or more other articles or elements.

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

The term "catalyst" refers to a material that promotes a chemical reaction.

The term "catalytic article" or "catalyst article" refers to a component that is used to promote a desired reaction. The present catalytic articles comprise a "substrate" having at least one catalytic coating disposed thereon.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, a CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process. An SCR catalyst composition can also be coated directly onto a wall-flow filter, which is referred to as SCRoF.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for RC storage; and optionally promoters and/or stabilizers.

In general, the term "effective" means, for example, from about 35% to 100% effective, for instance, from about 40%, about 45%, about 50%, about 55%, about 60%, about 65%, about 70%, about 75%, about 80%, about 85%, about 90%, about 95%, or about 100% effective, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is, for example, exhaust of a lean burn engine, which may contain certain non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, "impregnated" or "impregnation" refers to permeation of the catalytic material into the porous structure of the support material.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

"LNT" refers to a lean $NO_x$ trap, which is a catalyst containing a platinum group metal, cerin, and an alkaline earth trap material suitable to adsorb $NO_x$ during lean conditions (for example, BaO or MgO). Under rich conditions, $NO_x$ is released and reduced to nitrogen.

The term "$NO_x$" refers to nitrogen oxide compounds, such as NO, $NO_2$, or $N_2O$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant.

"SCRoF" refers to an SCR catalyst composition coated directly onto a wall-flow filter.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Reference to "monolithic substrate" means a unitary structure that is homogeneous and continuous from inlet to outlet.

The term "supported" means "dispersed on", "incorporated into", "impregnated into", "on", "in", "deposited on", or otherwise associated with.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A washcoat is formed by preparing a slurry containing a specified solids content (e.g., 10-50% by weight) of catalyst in a liquid, which is then coated onto a substrate and dried to provide a washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Unless otherwise indicated, all parts and percentages are by weight. "Weight percent (wt %)," or "percent by weight", if not otherwise indicated, is based on an entire composition free of any volatiles, that is, based on dry solids content.

NON-LIMITING EXAMPLE EMBODIMENTS

Without limitation, some embodiments of the disclosure include:
1. A catalyst composition comprising:
   a catalytically active platinum group metal (PGM) component, and
   a magnetic ferrite support material, the magnetic ferrite support material capable of inductive heating in response to an applied alternating magnetic field, wherein the active platinum group metal is disposed or impregnated on the magnetic ferrite support material.
2. The catalyst composition of embodiment 1, wherein the magnetic ferrite support material comprises iron, and one or more elements selected from the group consisting of zinc, cobalt, nickel, yttrium, manganese, copper, barium, strontium, scandium, and lanthanum.
3. The catalyst composition of embodiment 1, wherein the magnetic ferrite support material comprises iron, and one or more elements selected from the group consisting of zinc, cobalt, nickel, and yttrium.
4. The catalyst composition of embodiment 1, wherein the magnetic ferrite support material comprises iron, nickel, and zinc.
5. The catalyst composition of embodiment 4, wherein a nickel/zinc molar ratio of the magnetic ferrite support material is from about 1/99 to about 99/1.
6. The catalyst composition of embodiment 5, wherein the nickel/zinc molar ratio is from about 25/75 to about 75/25.
7. The catalyst composition of embodiment 5, wherein the nickel/zinc molar ratio is about 50/50.
8. The catalyst composition of embodiment 4, wherein the magnetic ferrite support material has the molecular formula $Ni_{0.5}Zn_{0.5}Fe_2O_4$.
9. The catalyst composition of embodiment 1, wherein the magnetic ferrite support material comprises iron, cobalt, and zinc.
10. The catalyst composition of embodiment 9, wherein a cobalt/zinc molar ratio of the magnetic ferrite support material is from about 1/99 to about 99/1.
11. The catalyst composition of embodiment 10, wherein the cobalt/zinc molar ratio is from about 25/75 to about 75/25.
12 The catalyst composition of embodiment 10, wherein the cobalt/zinc molar ratio is about 50/50.
13. The catalyst composition of embodiment 9, wherein the magnetic ferrite support material has the molecular formula. $Co_{0.5}Zn_{0.5}Fe_2O_4$.
14. The catalyst composition of embodiment 1, wherein the magnetic ferrite support material comprises iron and yttrium.
15. The catalyst composition of embodiment 14, wherein the magnetic ferrite support material has the molecular formula $Y_3Fe_5O_{12}$.
16. The catalyst composition of any of embodiments 1-15, wherein the magnetic ferrite support material is calcined at a temperature of about 400° C. to about 1200° C. for about an hour or more.
17. The catalyst composition of any of embodiments 1-16, wherein the magnetic ferrite support material is calcined at a temperature of about 600° C. to about 900° C. for about an hour or more.
18. The catalyst composition of any of embodiments 1-17, wherein the magnetic ferrite support material is in the form of particles having an average particle size from about 40 μm to about 1 μm.
19. The catalyst composition of any of embodiments 1-17, wherein the magnetic ferrite support material is the form of nanoparticles.
20. The catalyst composition of any of embodiments 1-19, wherein a temperature of the catalyst composition is increased by exposure to an alternating magnetic field.
21. The catalyst composition of any of embodiments 1-20, wherein the PGM component is platinum, palladium, rhodium, or a combination thereof.

22. The catalyst composition of any of embodiments 1-21, wherein the magnetic ferrite support material has a Brunauer-Emmett-Teller (BET) surface area of less than about 100 m²/g.

23. The catalyst composition of any of embodiments 1-22, wherein a coercivity of the magnetic ferrite support material is from about 1 to about 20 kA/m.

24. The catalyst composition of any of embodiments 1-23, configured as a diesel oxidation catalyst (DOC), a catalyzed soot filter (CSF) catalyst, a lean NOx trap (LNT) catalyst, an ammonia oxidation (AMOx) catalyst, or a three-way catalyst (MC).

25. A catalytic article for treatment of exhaust gas emissions from an internal combustion engine, comprising:
a substrate in the form of a flow-through substrate or wall-flow filter, having the catalyst composition of any of embodiments 1-24 deposited thereon.

26. The catalytic article of embodiment 25, adapted for use as a diesel oxidation catalyst (DOC), catalyzed soot filter (CSF), lean NOx trap (LNT), selective catalytic reduction (SCR) catalyst, ammonia oxidation (AMOx) catalyst, or three-way catalyst (TWC).

27. The catalytic article of embodiment 26, configured as a diesel oxidation catalyst (DOC) article.

28. An emission control system comprising:
the catalytic article of any one of embodiments 25-27; and
a conductor for receiving current and generating an alternating magnetic field in response thereto, the conductor positioned such that the generated alternating magnetic field is applied to at least a portion of the catalyst composition.

29. The emission control system of embodiment 28, wherein the conductor is in the form of a coil of conductive wire surrounding at least a portion of the catalytic article.

30. The emission control system of embodiment 28 or 29, further comprising an electric power source electrically connected to the conductor for supplying alternating current thereto.

31. The emission control system of any of embodiments 28-30, further comprising:
a temperature sensor positioned to measure a temperature of gases entering the catalytic article; and
a controller in communication with the temperature sensor, the controller adapted for control of the current supplied to the conductor, such that the controller energizes the conductor with current when heating of the catalytic article is desired.

32. A method of treating exhaust gas emissions from an internal combustion engine, comprising passing the exhaust gas emissions through the emission control system of any of embodiments 28-31.

33. The method of embodiment 32, wherein the internal combustion engine is a gasoline engine, diesel engine, hybrid electric, or natural gas engine.

34. A catalyst for fixed bed reactor design comprising a catalyst bed having a catalyst composition, the catalyst composition comprising:
a catalytic material; and
at least one magnetic component, wherein the magnetic component comprises at least one magnetic ferrite support material.

35. A fixed bed catalyst system comprising:
the catalyst of embodiment 34; and
a conductor for receiving current and generating an alternating magnetic field in response thereto, the conductor positioned such that the generated alternating magnetic field is applied to at least a portion of the catalyst composition.

36. A method for producing a catalytic material, the method comprising:
heating a magnetic ferrite support material at a temperature of about 600° C. or greater about an hour or more; and
combining the heated magnetic ferrite support material catalytic material.

37. A method for producing a catalytic material, the method comprising:
heating a magnetic ferrite support material for a time and at a temperature sufficient to decrease a Brunauer-Emmett-Teller (BET) surface area of the magnetic ferrite support material to less than about 100 m²/g; and
combining the heated ferrite support material with catalytic material.

I. Catalyst Composition

In one aspect is provided a catalyst composition comprising a catalytically active platinum group metal (KM) component disposed on or impregnated in a magnetic ferrite support material, wherein the magnetic ferrite support material is capable of inductive heating in response to an applied alternating electromagnetic field. Each of the components of the catalyst composition is further described herein below.

Magnetic Ferrite Support Material

As used herein, a "magnetic ferrite support material" is an inorganic oxide of a magnetic metal, usually ionic or covalently bonded. Such materials can be crystalline or amorphous, and tend to be porous. Generally, magnetic metal oxides tend to be highly stable at the operating temperatures often associated with catalyst systems used to treat emissions from engines, making them suitable as a potential catalyst support. In some embodiments, the magnetic ceramic material is a ferrite. A ferrite is a ceramic material made by mixing and firing large proportions of iron(III) oxide ($Fe_2O_3$) blended with small proportions of one or more additional metallic elements, including, but not limited to, barium, manganese, nickel, and zinc. Ferrites are electrically non-conductive, meaning that they are insulators, and ferrimagnetic, meaning they can easily be magnetized or attracted to a magnet. Ferrites can be divided into families (classified as "soft", "semi-hard", or "hard") based on their resistance to being demagnetized (magnetic coercivity). Soft ferrites have low coercivity, meaning that the material's magnetization can easily reverse direction. Soft ferrites are used in transformer or electromagnetic cores, and generally contain nickel, zinc, and/or manganese compounds along with iron oxide. Such materials act as conductors of magnetic field without dissipating much energy (hysteresis losses), while the material's high resistivity prevents eddy currents. Generally, soft ferrites do not exhibit strong heating upon exposure to a magnetic field. In contrast, hard ferrites have high coercivity, and so are difficult to demagnetize, making them useful as permanent magnets, but generally unsuitable for hysteresis heating applications. Semi-hard ferrites have properties that are in between soft and hard magnetic, and have desirable properties with regard to inductive heating, for example, being thermally and electrically insulating. In some embodiments, the magnetic ceramic material is a semi-hard ferrite. In some embodiments, the coercivity of the magnetic ceramic support material is from about 1 to about 20 kA/m.

Many ferrites adopt the mixed oxide spinel structure with a formula $AB_2O_4$, where A and B represent various metal cations, usually including iron (Fe). Spinel ferrites usually adopt a crystal motif consisting of cubic close-packed (FCC) oxides ($O^{2-}$) with "A" cations occupying one eighth of the tetrahedral holes and "B" cations occupying half of the octahedral holes, $A^{2+}B_2^{3+}O_4^{2-}$. In some embodiments, the magnetic ferrite support material is a mixed oxide spinel ferrite of formula. $AB_2O_4$, where A comprises one or more transition metals, and B is iron.

As used herein, the term "transition metal" refers to any element in the d-block of the periodic table, which includes groups 3 to 12 on the periodic table. Transition metals include, e.g., scandium, titanium, vanadium, chromium, manganese, iron, cobalt, nickel, copper, zinc, yttrium, zirconium, niobium, molybdenum, technetium, ruthenium, rhodium, silver, cadmium, lanthanum, hafnium, tantalum, tungsten, rhenium, osmium, iridium, platinum, silver, gold, and mercury. Particularly suitable transition metals for use as a mixed oxide spinel ferrite as disclosed herein include one or more of iron, copper, chromium, nickel, zinc, manganese, cobalt, molybdenum, tungsten, titanium, or a combination thereof. In some embodiments, the magnetic ferrite support material comprises iron, and one or more elements chosen from (e.g., selected from the group consisting of) zinc, cobalt, nickel, yttrium, manganese, copper, barium, strontium, scandium, and lanthanum. In some embodiments, the magnetic ferrite support material comprises iron, and one or more elements chosen from (e.g., selected from the group consisting of) zinc, cobalt, nickel, and yttrium. In some embodiments, the magnetic ferrite support material comprises iron, nickel, and zinc. In some embodiments, the magnetic ferrite support material comprises iron, cobalt, and zinc. In some embodiments, the magnetic ferrite support material comprises iron and yttrium.

The molar ratio of the elements in the magnetic ferrite support material may vary. For example, in some embodiments, a molar ratio of nickel to zinc may be from about 1/99 to about 99/1, or from about 25/75 to about 75/25. In some embodiments, the molar ratio of nickel to zinc is about 1/1. In some embodiments, the magnetic ferrite support material comprises or has the molecular formula $Ni_{0.5}Zn_{0.5}Fe_2O_4$. In some embodiments, a molar ratio of cobalt to zinc may be from about 1/99 to about 99/1, or from about 25/75 to about 75/25. In some embodiments, the molar ratio of cobalt to zinc is about 1/1. In some embodiments, the magnetic ferrite support material comprises or has the molecular formula $Co_{0.5}Zn_{0.5}Fe_2O_4$. In some embodiments, the magnetic ferrite support material comprises or has the molecular formula $Y_3Fe_5O_{12}$.

The form (e.g., shape and size) of the magnetic ferrite support material can vary, and in certain embodiments, the magnetic ferrite support material is in a particulate form. In some embodiments, the size of the particles may directly impact the performance of the catalyst composition. In some embodiments, the particles have an average particle size of at least about 40 nm or greater (e.g., about 40 nm to about 1000 nm, about 50 nm to about 500 nm, or about 100 nm to about 300 nm). In some embodiments, the magnetic ferrite support material is in the form of nanoparticles.

The magnetic ferrite support material as disclosed herein is generally activated by heating the magnetic ferrite support material at an elevated temperature for a period of time. The temperature and time may vary based on the desired activity as well as the elemental composition of the magnetic ferrite support material. For example, in some embodiments, the magnetic ferrite support material is heated at a temperature from about 400° C. to about 1200° C., or from about 600° C. to about 900° C., for a period of time from about 1 minute to about 24 hours, or from about 30 minutes to about 12 hours, or from about 1 hour to about 6 hours. In some embodiments, the magnetic ferrite support material is heated at a temperature above about 600° C. for at least one hour. The surface area of the particles may vary. For example, in some embodiments, the particles have a Brunauer-Emmett-Teller (BET) surface area of less than about 100 m²/g. In some embodiments, the magnetic ferrite support material particles are heated as described above until the particles have a BET surface area of less than about 100 m²/g.

The magnetic ferrite support material as disclosed herein is capable of inductive heating in response to an applied alternating electromagnetic field. By "capable of inductive heating" is meant that the magnetic ferrite support material is responsive to application of an electric current, such that the ferrite support material can be characterized as being "heatable" (e.g., inductively heatable) upon application of the current. Exposing a suitable magnetic ferrite support material to an alternating electromagnetic field leads to magnetic hysteresis loss, which is dissipated as heat in the support material and associated composition. The use of inductive heating of a magnetic material associated with a catalyst composition is an efficient means to direct heat to the catalyst composition. By using magnetic hysteresis loss to heat the magnetic ferrite catalyst support directly, heat can be efficiently delivered specifically to the active site of a catalyst composition (i.e., the PGM supported on or within the magnetic ferrite support material). Because this heat is generated initially in the ferrite support material, such a system provides a way of directly heating the catalytically active portion of a catalyst composition, without having to heat the entire catalyst article comprising the composition, or the entire exhaust gas stream, to overcome the low catalyst activity otherwise encountered under low temperature (e.g., cold start) conditions.

PGM Component

The catalyst composition as disclosed herein comprises a catalytically active platinum group metal (PGM) component disposed on or impregnated in the magnetic ceramic support material. The term "PGM component," as used herein, refers to any component that includes a platinum group metal (PGM), for example, Ru, Rh, Os, Ir, Pd, Pt and/or Au. Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component comprises palladium, platinum, rhodium, rhenium, ruthenium, iridium, or a combination thereof. In some embodiments, the PGM component comprises palladium, platinum, rhodium, or a mixture thereof. In some embodiments, the PGM is palladium, platinum, rhodium, or a mixture thereof. In some embodiments, the PGM is palladium, platinum, or a mixture thereof. In some embodiments, the PGM is platinum.

The amount of the PGM associated with (e.g., disposed on or impregnated in) the magnetic ferrite support material may vary. In some embodiments, the PGM is present in an amount of about 0.01% to about 20% by weight of the magnetic ferrite support material. In some embodiments, the PGM is present in an amount of about 0.01%, about 0.02%, about 0.03%, about 0.04%, about 0.05%, about 0.06%, about 0.07%, about 0.08%, about 0.09%, or about 0.1%, about 0.5%, about 1.0%, about 2.0%, about 5.0%, about 10.0%, or about 20% by weight of the magnetic ferrite support material.

The catalyst composition as disclosed herein may be configured for use in different catalyst articles having different functions. For example, the catalyst material can be a diesel oxidation catalyst composition (DOC), a catalyzed soot filter (CSF) catalyst composition, a lean NOx trap (LNT) catalyst composition, an ammonia oxidation (AMOx) catalyst composition, or a three-way catalyst (TWC) catalyst composition. In any such catalyst composition, the typical support material for the PGM (e.g., a refractory metal oxide support material) may be replaced with a magnetic ferrite support material as described herein. The catalyst composition as disclosed herein, in addition to the PGM component and magnetic ferrite support material, may comprise further components as appropriate for the individual catalyst.

Diesel Oxidation Catalyst (DOC) or Catalyzed Soot Filter (CSF)

In some embodiments, the catalyst composition as disclosed herein is configured as a DOC or a CSF. A DOC or CSF typically comprises one or PGM components, and optionally further comprises an oxygen storage component (OSC) such as ceria or ceria/zirconia, and typically provides oxidation of both hydrocarbons and carbon monoxide.

Lean NOx Trap (LNT)

In some embodiments, the catalyst composition as disclosed herein is configured as an LNT. An LNT catalyst is capable of adsorbing NOx under lean conditions and reducing the stored NOx to nitrogen under rich conditions. An LNT catalyst generally contains one or more PGM components and NOx trapping components (e.g., ceria and/or alkaline earth metal oxides). Various such LNT compositions are known for use in treating the exhaust of diesel engines in order to trap and convert NOx components, with the PGM component performing the role of catalytic $NO_x$ oxidation and reduction.

Ammonia Oxidation (AMOx) Catalyst

In some embodiments, the catalyst composition as disclosed herein is configured as an AMOx catalyst. As used herein, the terms "ammonia destruction catalyst" or "ammonia oxidation catalyst (AMOx)" refer to a catalyst that promotes the oxidation of $NH_3$. Generally, an AMOx catalyst may be provided downstream of an SCR catalyst to remove any slipped ammonia from an exhaust gas treatment system comprising an SCR. An exemplary AMOx catalyst comprises a copper zeolite in conjunction with a supported platinum group metal. Typically, the PGM is platinum, palladium, rhodium, or combinations thereof.

Three-Way Catalyst (TWC)

In some embodiments, the catalyst composition as disclosed herein is configured as a TWC. As used herein, TWC refers to any catalyst composition known in the art for the conversion of HC, CO, and/or $NO_x$. TWCs typically contain PGM components, such as, for example palladium and/or rhodium and optionally platinum, and an oxygen storage component.

II. Catalyst Article

In another aspect is provided a catalyst article comprising a substrate having an inlet end and an outlet end defining an overall length, and a catalytic coating comprising one or more washcoats disposed on at least a portion of the substrate, wherein at least one of said one or more washcoats comprises the catalyst composition as disclosed herein.

Substrate

In one or more embodiments, a catalyst composition as disclosed herein (e.g., an oxidation catalyst composition including, but not limited to, a DOC, LNT, AMOx, or TWC catalyst composition comprising the magnetic ferrite support material as described herein) is disposed on a substrate to form a catalytic article. Catalytic articles comprising the substrates are generally employed as part of an exhaust gas treatment system (e.g., catalyst articles including, but not limited to, articles including the magnetic ferrite support material disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed catalyst composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes, such as pellets, compressed metallic fibers, corrugated sheet, or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 wt % to about 25 wt % chromium, about 1 wt % to about 8 wt % of aluminum, and from 0 wt % to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type having a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., a monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Figure 1B:
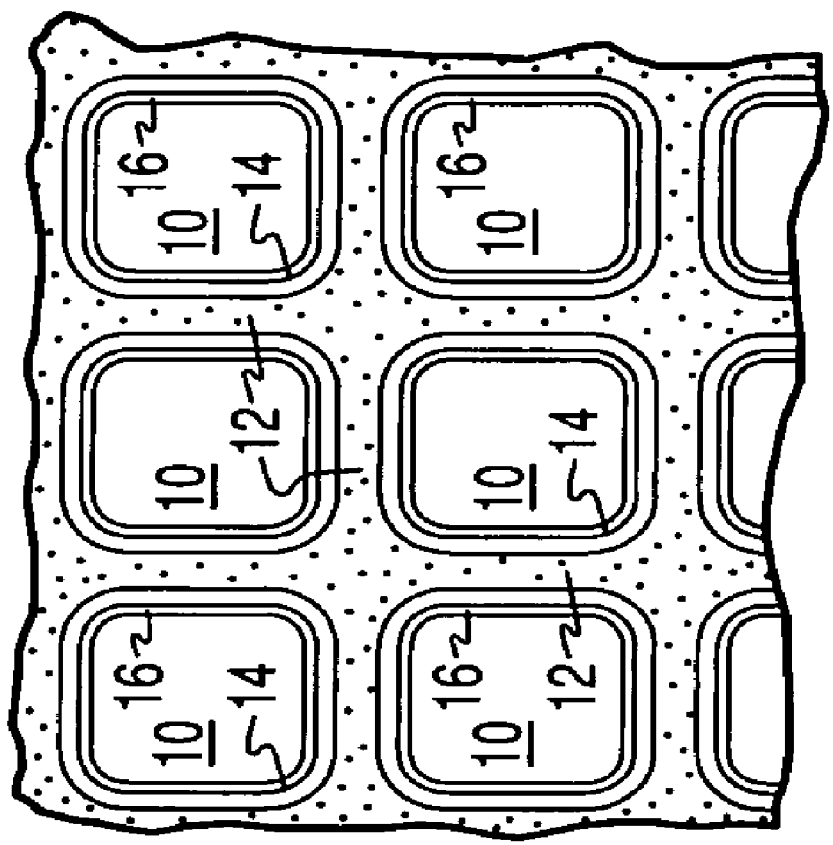
FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1A, in an embodiment wherein the substrate is a flow-through substrate.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example, from about 200 cpsi to about 400 cpsi and a wall thickness of from about 50 microns to about 200 microns or about 400 microns, FIGS. 1A and 1B illustrate an exemplary substrate 2 in the form of a flow-through substrate coated with a catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 18, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present disclosure can be practiced with one or more (e.g., two, three, or four or more) catalyst composition layers and is not limited to the two-layer embodiment illustrated in FIG. 1B.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
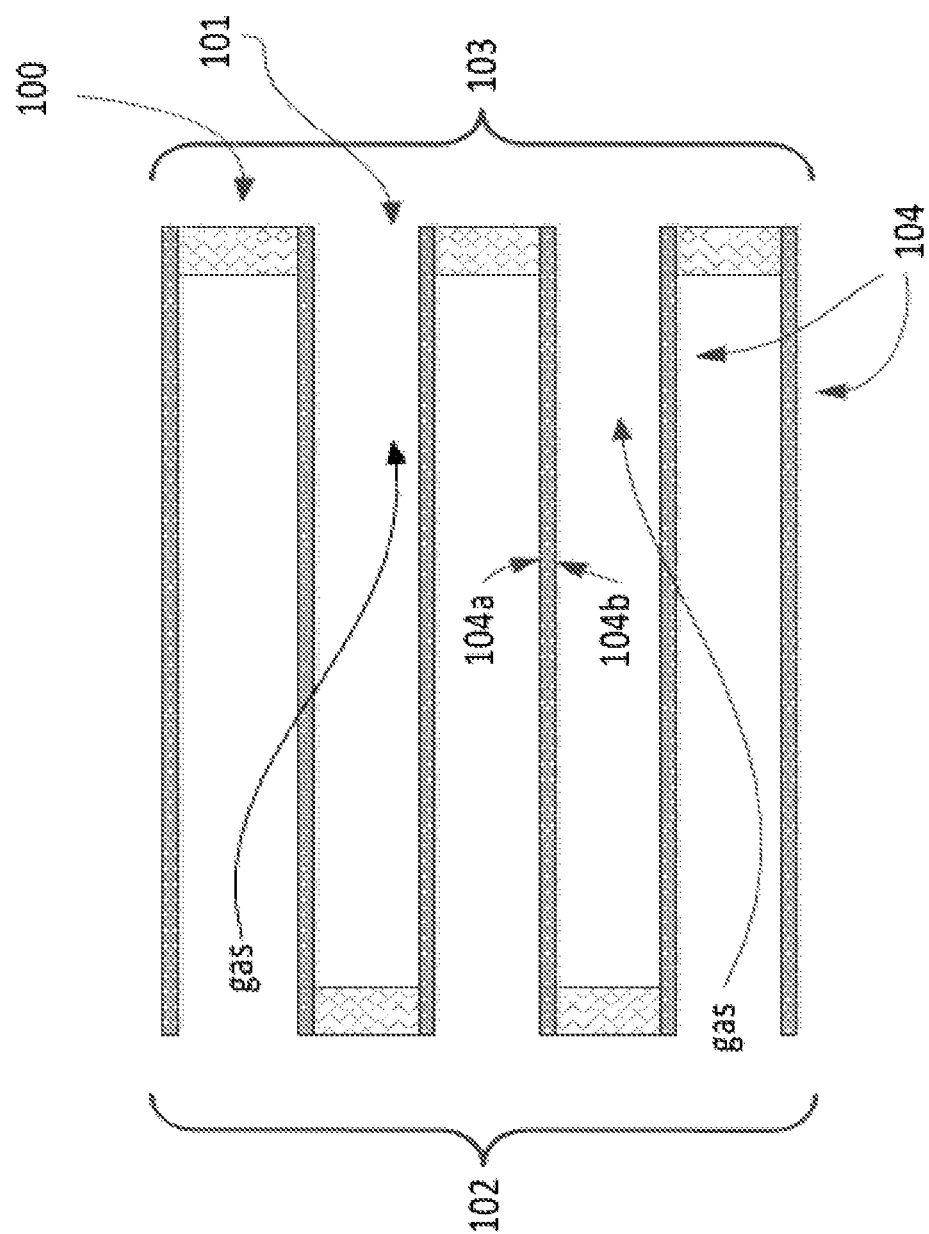
FIG. 2 is a cutaway view of a representative wall-flow filter.

A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104*a* and outlet side 104*b*. The passages are enclosed by the cell walls.

The wall-flow filter article substrate may have a volume of, for instance, from about 50 cm$^3$, about 100 in$^3$, about 200 in$^3$, about 300 in$^3$, about 400 in$^3$, about 500 in$^3$, about 600 in$^3$, about 700 in$^3$, about 800 in$^3$, about 900 in$^3$ or about 1000 in$^3$ to about 1500 in$^3$, about 2000 in$^3$, about 2500 in$^3$, about 3000 in$^3$, about 3500 in$^3$, about 4000 in$^3$, about 4500 in$^3$, or about 5000 in$^3$. Wall-flow filter substrates typically have a wall thickness from about 50 microns to about 2000 microns, for example, from about 50 microns to about 450 microns, or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of from about 50%, about 60%, about 65%, or about 70% to about 75% and an average pore diameter of from about 10 microns, about 20 microns, about 30 microns, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Coating Compositions and Configurations

To produce catalytic articles of the present disclosure, a substrate as described herein is contacted with a catalyst composition as disclosed herein to provide a coating (i.e., a slurry comprising particles of the catalyst composition are disposed on a substrate). The coatings are "catalytic coating compositions" or "catalytic coatings." A "catalyst composition" and a "catalytic coating composition" are synonymous.

Catalyst compositions as disclosed herein may be prepared using a binder, for example, a ZrO$_2$ binder derived from a suitable precursor, such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of SiO$_2$, including silicates and colloidal silica. Accordingly, in addition to the catalyst composition, the coating slurry may optionally contain a binder in the form of alumina, silica, zirconium acetate, colloidal zirconia, or zirconium hydroxide, associative thickeners, and/or surfactants (including anionic, cationic, non-ionic, or amphoteric surfactants). Other exemplary binders include boehmite, gamma-alumina, or delta/theta alumina, as well as silica sol. When present, the binder is typically used in an amount of about 1-5 wt % of the total washcoat loading.

The present catalytic coating may comprise one or more coating layers, where at least one layer comprises the present catalyst composition. The present catalytic coating may comprise a single layer or multiple coating layers. The catalytic coating may comprise one or more thin, adherent coating layers disposed on and in adherence to least a portion of a substrate. The entire coating comprises the individual "coating layers."

In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a catalytic coating disposed on the substrate" means on any surface, for example, on a wall surface and/or on a pore surface.

The present catalyst composition may typically be applied in the form of one or more washcoats containing the catalyst composition as disclosed herein. A washcoat is formed by preparing a slurry containing a specified solids content (e.g., about 10% to about 60% by weight) of catalyst in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

The above-noted catalyst composition(s) are generally independently mixed with water to form a slurry for purposes of coating a catalyst substrate, such as a honeycomb-type substrate. In addition to the catalyst particles, the slurry may optionally contain a binder as described above, water-soluble or water-dispersible stabilizers, promoters, associative thickeners, and/or surfactants (including anionic, cationic, non-ionic, or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to reduce the particle size and enhance particle mixing. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 10 microns to about 40 microns, for example, 10 microns to about 30 microns, for example, about microns to about 15 microns. The $D_{90}$ is determined using a dedicated particle size analyzer.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 minutes-3 hours). In some embodiments, the drying is performed at a temperature of from about 100 to about 150° C. In some embodiments, drying is performed in a gas atmosphere. In some embodiments, the gas atmosphere comprises oxygen. In some embodiments, the drying is performed for a duration of time in the range of from 10 minutes to 4 hours, for example, in the range of from 20 minutes to 3 hours, for example, from 50 minutes to 2.5 hours.

The coated substrate is then calcined by heating, e.g., at 400-600° C., typically for about 10 minutes to about 3 hours. In some embodiments, the calcination is performed at a temperature of from about 300° C. to 900° C., from about 400° C. to about 650° C., or from about 450° C. to about 600° C. In some embodiments, the calcination is performed in a gas atmosphere. In some embodiments, the gas atmosphere comprises oxygen. In some embodiments, the calcination is performed for a duration of time in the range of from 10 minutes to about 8 hours, from about 20 minutes to about 3 hours, or from about 30 minutes to about 2.5 hours. Following drying and calcining, the final washcoat coating layer can be viewed as essentially solvent-free.

After calcining, the catalyst loading Obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

Coating Configurations

In some embodiments, the present catalytic articles may include the use of one or more catalyst layers and combinations of one or more catalyst layers. The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance, a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end, where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80%, or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85%, or about 95% of the substrate length from either the inlet end of outlet end, wherein at least a portion of the top layer overlays the bottom layer. This "overlay" zone may, for example, extend from about 5% to about 80% of the substrate length, for example, about 5%, about 10%, about 20%, about 30%, about 40%, about 50%, about 60%, or about 70% of the substrate length.

In some embodiments, the catalyst composition as disclosed herein, disposed on the substrate as disclosed herein, comprises a first washcoat disposed on at least a portion of the length of the catalyst substrate. In some embodiments, the first washcoat is disposed directly on the catalyst substrate, and a second washcoat (either the same or comprising a different catalyst or catalyst component) is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20% to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat. In some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

The catalytic coating may advantageously be "zoned," comprising zoned catalytic layers, that is, where the catalytic coating contains varying compositions across the axial length of the substrate. This configuration may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60%, or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream, and middle zones. Where for example, a coating layer extends the entire length of the substrate and a different coating layer extends from the outlet end a certain length and overlays a portion of the first coating layer, there are upstream and downstream zones.

For instance, the catalyst article may comprise an upstream zone comprising the first washcoat layer; and a downstream zone comprising the second washcoat layer comprising a different catalyst material or component. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

Figure 3A:
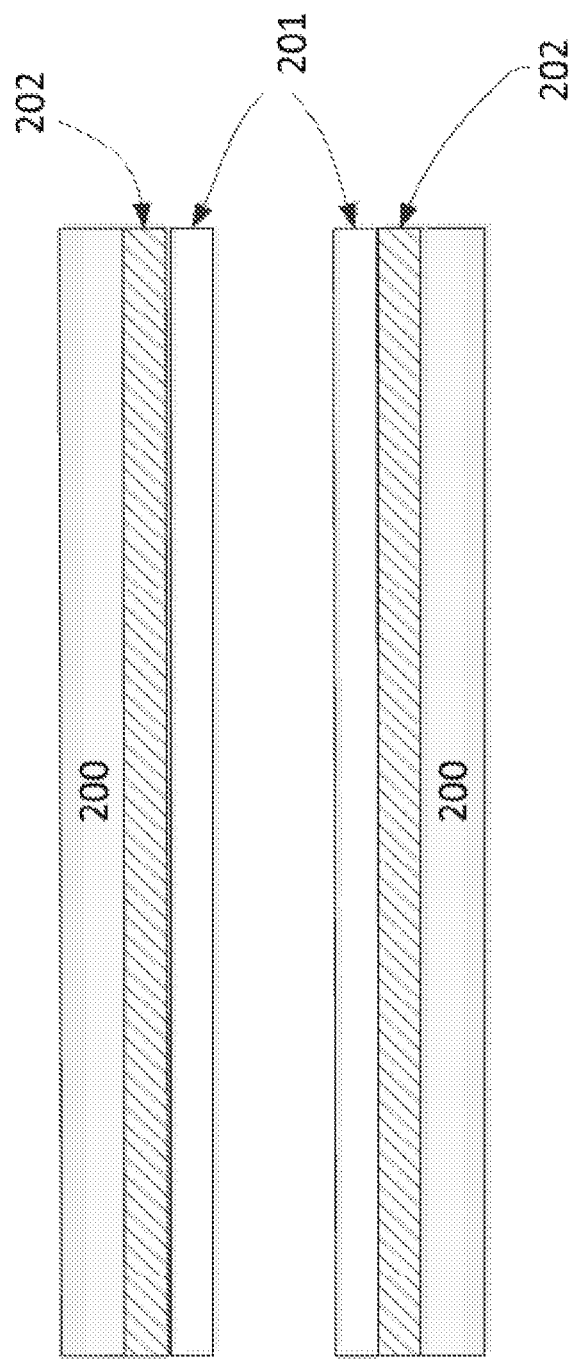
FIGS. 3A, 3B, and 3C are non-limiting illustrations of possible coating configurations according to certain embodiments.
Figure 3B:
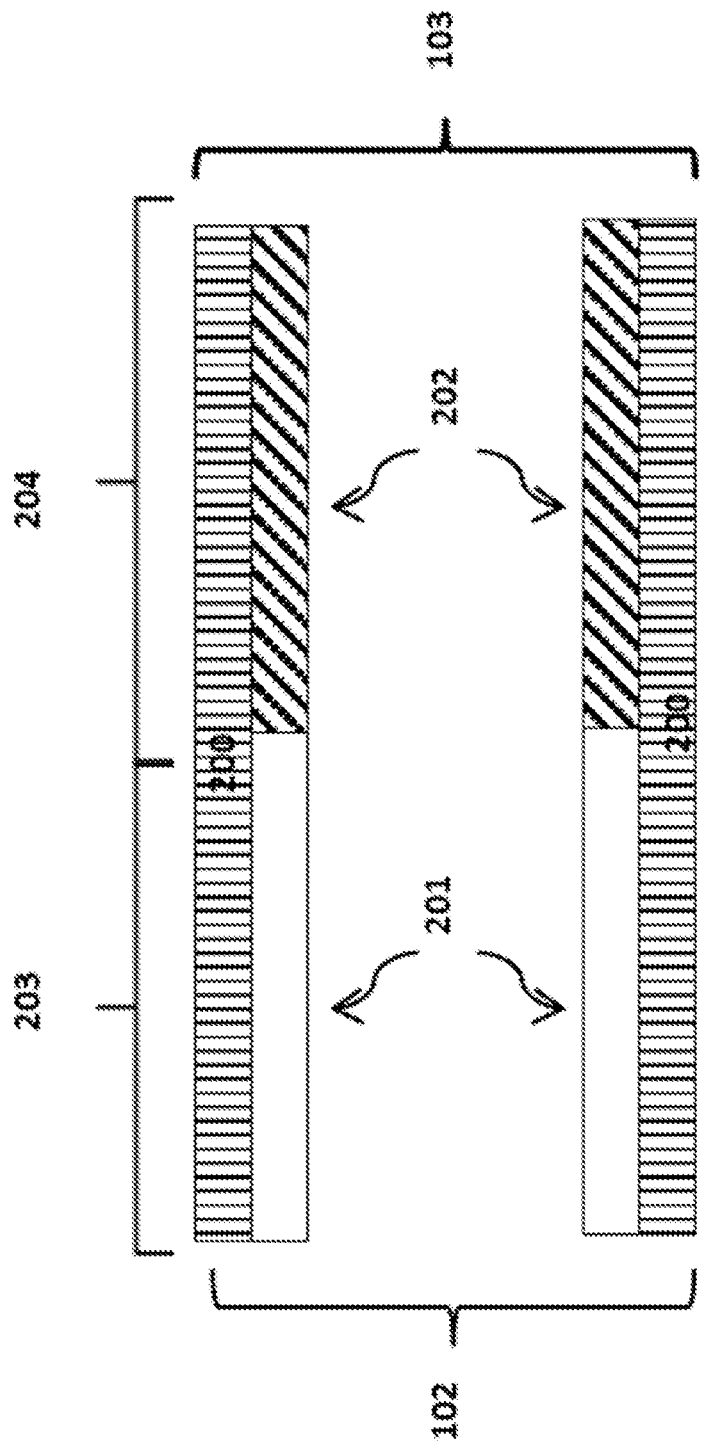
Figure 3C:
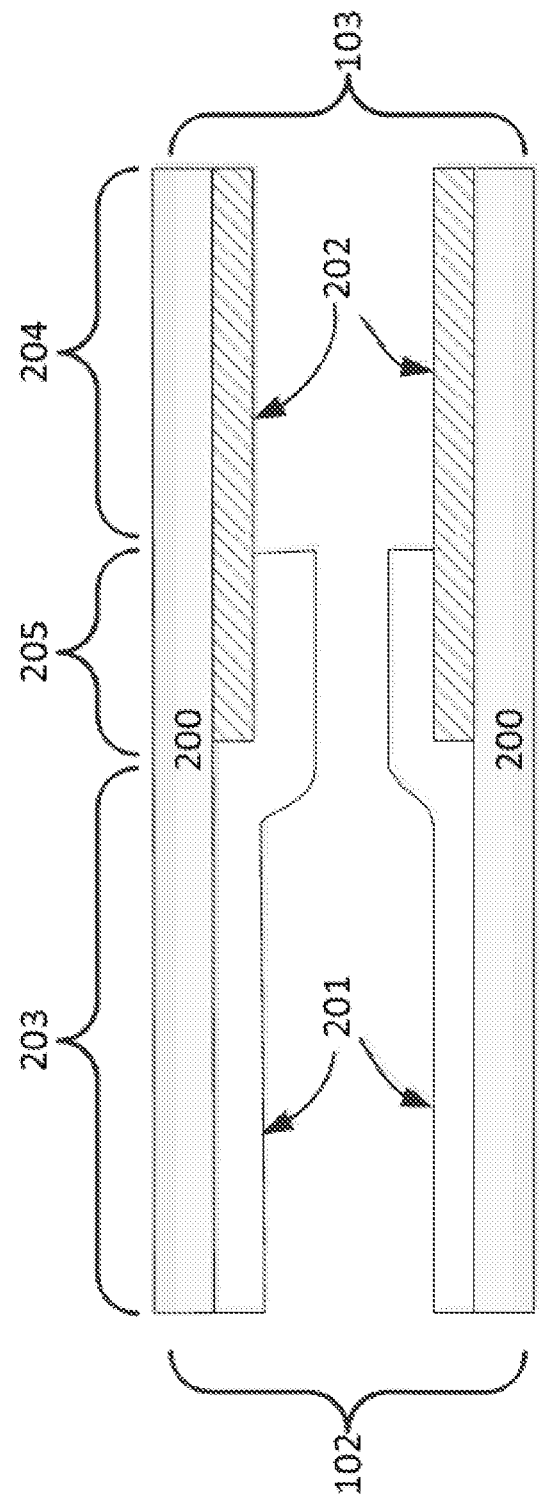

FIGS. 3A, 3B, and 3C show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 3A, coating layers 201 and 202 each extend the entire length of the substrate with top layer 201 overlaying bottom layer 202. The substrate of FIG. 3A does not contain a zoned coating configuration. FIG. 3B is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. In FIG. 3C, bottom coating layer 202 extends from the outlet about 50% of the substrate length and top coating layer 201 extends from the inlet greater than 50% of the length and overlays a portion of layer 202, providing an upstream zone 203, a middle overlay zone 205, and a downstream zone 204. FIGS. 3A, 3B, and 3C may be useful to illustrate a catalyst composition as disclosed herein, coated on a wall-flow substrate or a flow-through substrate. In some embodiments, the substrate is a honeycomb substrate. In some embodiments, the honeycomb substrate is a flow-through substrate or a filter.

In some embodiments, the catalyst article comprising the catalyst composition as disclosed herein disposed on a substrate is adapted for use as a diesel oxidation catalyst (DOC) article, a catalyzed soot filter (CSF), a lean NOx trap (LNT) article, an ammonia oxidation (AMOx) catalyst article, or a three-way catalyst (TWC) article. In some embodiments, the catalyst article is a diesel oxidation catalyst (DOC) article.

III. Catalyst Components

In another aspect is provided a catalyst component comprising the catalyst article as disclosed herein, and further comprising inductive heating components. Generally, such inductive heating components include a conductor associated with the catalyst article for receiving current and generating an alternating electromagnetic field in response thereto. The conductor is positioned such that the generated alternating electromagnetic field is applied to at least a portion of the catalyst composition. Further inductive heating components include a power source, controllers, temperature sensors, and the like. Catalyst components comprising such inductive heating components may be more readily described by reference to FIGS. 4-6.

Figure 4:
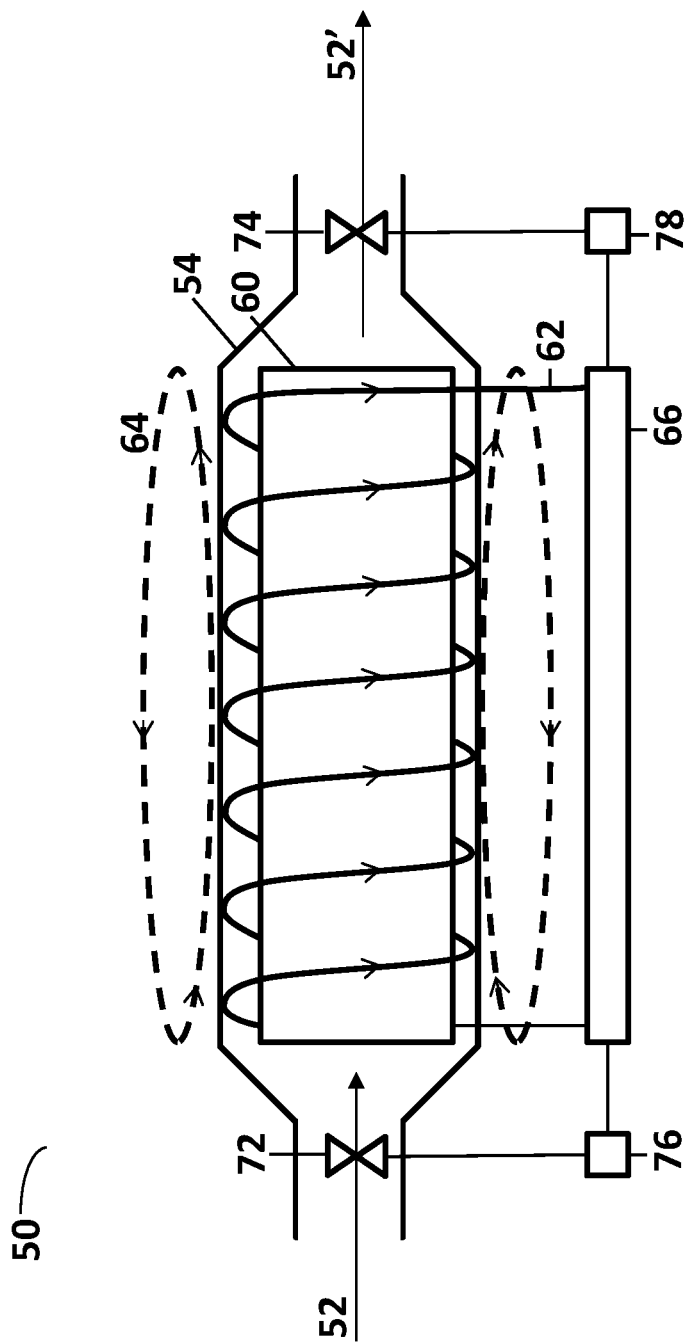
FIG. 4 is a schematic depiction of an embodiment of an emission treatment system 50 in which a catalytic article of the present disclosure is utilized; and illustrates associated electrical conductors, controllers, power sources, and temperature sensors.

FIG. 4 shows a simplified, non-limiting embodiment of a system 50 in which a catalyst article 60 of the present disclosure is functionalized to allow for inductive heating of the catalyst composition as disclosed herein. Referring to FIG. 4, catalyst component 50 includes an electric coil 62 surrounding catalytic article 60 in order to provide an alternating magnetic field 64 adapted for inductive heating of the ferrite magnetic support material comprising catalytic article 60. The electric coil 62 is electrically connected to a power source 66 capable of providing alternating electric current to the coil, with output power typically in the range of about 5 to 50 kW and at a frequency of about 100-10000 kHz.

The component 50 further includes an optional temperature sensor 72 positioned to measure the temperature of engine effluent gases 52 entering the article 60, and an optional temperature sensor 74 positioned to measure the temperature of engine effluent gases 52' exiting the article 60. Both the power source 66 and the temperature sensors 72 and 74 are operatively connected to controllers 76 and 78, which are configured to control the power source 66 and receive the temperature signals from the sensors. As would be understood, the controllers 76 and 78 can comprise hardware and associated software adapted to allow the controllers to provide instructions to the power source to energize the electric coil 62 at any time when inductive heating is desired. The controllers can select the time period for inductive heating based on a variety of factors, such as based on a particular temperature set point associated with the temperature sensors 72 and/or 74, at specific time period based on ignition of the engine (e.g., a control system adapted to inductively heat the ceramic magnetic support material for a set time period following engine ignition), or at specific preset time intervals. Advantageously, the controller(s) 76 and 78 can inductively heat catalytic article 60 when temperature sensor 72 is at below the temperature at which the catalyst composition is effective (e.g., for oxidizing hydrocarbons, carbon monoxide, and NOx).

It is noted that the depicted embodiment is not intended to be limiting of the coil construction. For example, in some embodiments, the coil does not comprise a single coil, and, rather, comprises two or more individual coils. In some such configurations, the substrate may be surrounded on the front (upstream) end with one coil and on the back (downstream) end with another coil, optionally having a gap there between. It is also noted that the depicted coil 62 wraps around the catalyst article axially, such that the magnetic field is parallel to the gas flow. However, the disclosed system is not limited thereto. In certain embodiments, the coil 62 (or multiple coils, as referenced above) can be placed laterally on the catalyst article, such that the magnetic field generated thereby is transverse to the gas flow. In alternative embodiments, the coil 62 could be placed in other locations such as also surrounding the exhaust pipe can 54 or other catalyst components of the system.

Figure 5:
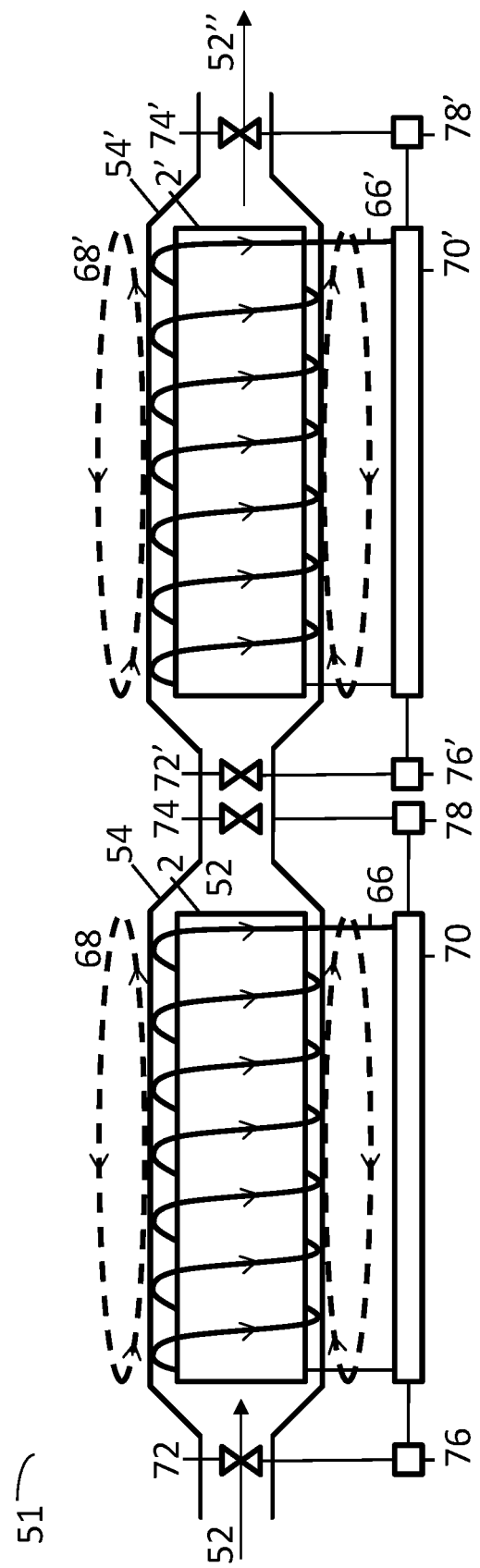
FIG. 5 is a schematic depiction of an embodiment of an emission treatment system 51 in which more than one catalytic article of the present disclosure is utilized, and illustrates associated electrical conductors, controllers, power sources, and temperature sensors.

FIG. 5 illustrates a non-limiting embodiment of a system 51, which is a similar system to system 50, but employing more than one inductively heatable catalyst article 2 and 2' (each of which contains a magnetic ferrite support material as disclosed herein, each of which can be the same or different, and which can comprise the same or different quantities thereof). Electric coils 66 and 66' surround catalyst articles 2 and 2' in order to provide alternating magnetic fields 68 and 68' adapted for inductive heating of the magnetic ferrite support material within the catalyst compositions. The system includes optional temperature sensors 72, 72', 74, and 74', which are operatively connected to controllers 76, 76', 78 and 78', respectively, configured to control the associated power sources 70 and 70' and receive the temperature signals from the corresponding sensors. It is noted that, in some embodiments, there may be a single temperature controller in place of 74 and 72' and, in such embodiments, that temperature sensor may be attached to and configured to control, both power sources 70 and 70'.

In some embodiments, the catalyst article is a DOC article, comprising the catalyst composition as disclosed herein configured as a DOC composition.

In some embodiments, the catalyst article is a CSF article, comprising the catalyst composition as disclosed herein configured as a CSF composition.

In some embodiments, the catalyst article is a LNT catalyst article, comprising the catalyst composition as disclosed herein configured as a LNT composition.

In some embodiments, the catalyst article is an AMOx catalyst article, comprising the catalyst composition as disclosed herein article as an AMOx catalyst composition.

In some embodiments, the catalyst article is a TWC catalyst article, comprising the catalyst composition as disclosed herein configured as a TWC composition.

IV. Exhaust Gas Treatment Systems

In a further aspect is provided an exhaust gas treatment system comprising at least one catalyst article as disclosed herein, located downstream of and in fluid communication with a lean burn engine that produces an exhaust gas stream. The engine can be, e.g., a diesel engine which operates at combustion conditions with air in excess of that required for stoichiometric combustion, i.e., lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein may comprise a diesel oxidation catalyst (DOC), a soot filter (which can be catalyzed or uncatalyzed), a selective catalytic reduction (SCR) catalyst, a urea injection component, an ammonia oxidation catalyst (AMOx), a low-temperature $NO_x$ absorber (LT-NA), a lean $NO_x$ trap (LNT), and combinations thereof. For instance, the present exhaust gas treatment system may comprise, from upstream to downstream, a component containing a DOC composition, a component containing a CSF composition, a urea injector, a component containing an SCR catalyst composition, a component containing an AMOx catalyst composition, and a component containing a lean $NO_x$, trap (LNT) composition.

The relative placement of the various catalytic components present within the exhaust gas treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 6:
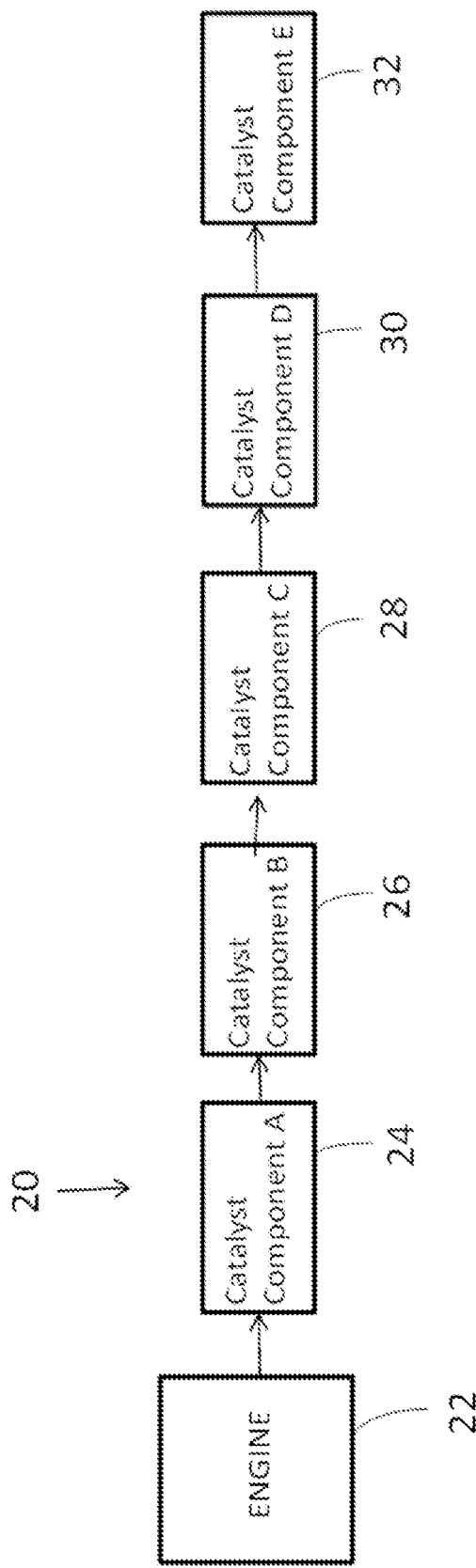
FIG. 6 is a schematic depiction of an embodiment of an emission treatment system in which a catalytic article of the present disclosure is utilized, and illustrates the direction of travel of an engine effluent.

One exemplary exhaust gas treatment system is illustrated in FIG. 6, which depicts a schematic representation of an exhaust gas treatment system 20. As shown, the exhaust gas treatment system can include a plurality of catalyst components in series downstream of an engine 22, such as a lean burn gasoline engine. At least one of the catalyst components will be a catalyst component as set forth herein. FIG. 6 illustrates five catalyst components, 24, 26, 28, 30, 32 in series; however, the total number of catalyst components can vary and five components is merely one example. One of skill in the art will recognize that it may be desirable to arrange the relative position of each article in a different order than illustrated herein; such alternative ordering is contemplated by the present disclosure.

Without limitation, Table 1 presents various exhaust gas treatment system configurations of one or more embodiments. It is noted that each catalyst is connected to the next catalyst via exhaust conduits such that the engine is upstream of Component A, which is upstream of Component B, which is upstream of Component C, which is upstream of Component D, which is upstream of Component E (when present). The reference to Components A-E in the table can be cross-referenced with the same designations in FIG. 6.

As recognized by one skilled in the art, in the configurations listed in Table 1, any one or more of Components A, B, C, D, or E can be disposed on a particulate filter, such as a wall flow filter, or on a flow-through honeycomb substrate. In one or more embodiments, an engine exhaust system comprises one or more catalyst components mounted in a position near the engine (in a close-coupled position, CC), with additional catalyst components in a position underneath the vehicle body (in an underfloor position, UF). In one or more embodiments, the exhaust gas treatment system may further comprise a urea injection component.

The DOC component noted in Table 1 may comprise any catalyst conventionally used as a DOC (e.g., comprising a PGM and refractory metal oxide support material). Alternatively, the DOC component may comprise a DOC composition, article, or component as disclosed herein.

The LNT component noted in Table 1 may comprise any catalyst conventionally used as a $NO_x$ trap. Alternatively, the LNT catalyst may comprise an LNT catalyst composition, article, or component as disclosed herein.

The LT-NA component noted in Table 1 may comprise any catalyst that can adsorb $NO_x$, (e.g., NO or $NO_2$) at low temperatures (<250° C.) and release it to the gas stream at high temperatures (>250° C.). The released $NO_x$, is generally converted to $N_2$ and $H_2O$ over a down-stream SCR or SCRoF catalyst, such as disclosed herein. Typically, a LT-NA catalyst comprises Pd-promoted zeolites or Pd-promoted refractory metal oxides.

Reference to SCR in Table 1 refers to an SCR catalyst component. Reference to SCRoF (or SCR on filter) refers to a particulate or soot filter (e.g., a wall-flow filter), which can include an SCR catalyst composition. The SCR or SCROF component may comprise any conventional SCR catalyst known in the art.

The AMOx component noted in Table 1 may comprise any conventional AMOx catalyst known in the art. In one or more embodiments, the AMOx component may comprise a bottom coat with PGM and a top coat with SCR functionality. Alternatively, the AMOx component may comprise an AMOx catalyst composition, article, or component as disclosed herein.

TABLE 1

Possible exhaust gas treatment system configurations

| Component A | Component B | Component C | Component D | Component E |
|---|---|---|---|---|
| DOC | SCR | Optional AMOx | — | — |
| DOC | SCRoF | Optional AMOx | — | — |
| DOC | SCRoF | SCR | Optional AMOx | — |
| DOC | SCR | SCRoF | Optional AMOx | — |
| DOC | SCR | SCRoF | CSF | Optional AMOx |
| DOC | SCR | CSF | Optional AMOx | — |
| DOC | CSF | SCR | Optional AMOx | — |
| LNT | CSF | SCR | Optional AMOx | — |
| LNT | SCRoF | SCR | Optional AMOx | — |
| LT-NA | CSF | SCR | Optional AMOx | — |
| LT-NA | SCRoF | SCR | Optional AMOx | — |

TABLE 1-continued

Possible exhaust gas treatment system configurations

| Component A | Component B | Component C | Component D | Component E |
|---|---|---|---|---|
| DOC | LNT | CSF | SCR | Optional AMOx |
| DOC | LNT | SCRoF | SCR | Optional AMOx |
| DOC | LT-NA | CSF | SCR | Optional AMOx |
| DOC | LT-NA | SCRoF | SCR | Optional AMOx |

As noted above, any one or more than one of the DOC, CSF, AMOx catalyst, and LNT may comprise a catalyst composition as disclosed herein, with any remaining catalyst composition being of a conventional nature (i.e., not comprising the magnetic ferrite support material as disclosed herein). In some embodiments, only one of the DOC, CSF, AMOx catalyst, and LNT comprise a catalyst composition as disclosed herein, with the remaining catalyst compositions being of a conventional nature.

In some embodiments, the DOC component is a DOC component as disclosed herein, comprising a DOC article comprising a substrate having disposed on at least a portion thereof a catalyst composition as disclosed herein configured as a DOC composition, and further comprising inductive heating components.

In some embodiments, the CSF component is a CST component as disclosed herein, comprising a CSF article comprising a substrate having disposed on at least a portion thereof a catalyst composition as disclosed herein configured as a CST composition, and further comprising inductive heating components.

In some embodiments, the AMOx catalyst component is an AMOx catalyst component as disclosed herein, comprising an AMOx catalyst article comprising a substrate having disposed on at least a portion thereof a catalyst composition as disclosed herein configured as an AMOx catalyst composition, and further comprising inductive heating components.

In some embodiments, the LNT component is a LNT component as disclosed herein, comprising a INT article comprising a substrate having disposed on at least a portion thereof a catalyst composition as disclosed herein configured as a LNT composition, and further comprising inductive heating components.

V. Method of Treating Engine Exhaust

Another aspect of the present disclosure is directed to a method of treating the exhaust gas stream of an internal combustion engine, the method comprising contacting an exhaust gas stream from an internal combustion engine with the catalyst component or the exhaust gas treatment system as disclosed herein; and intermittently energizing the conductor by passing current therethrough to generate an alternating electromagnetic field, thereby inductively heating the catalyst material to a desired temperature.

The desired temperature range will vary depending on the catalyst type and function, but will typically be in the range of about 100° C. to about 450° C., for example, about 150° C., to about 350° C. In terms of specific, illustrative examples, a DOC will typically need to be heated to at least about 150° C. to promote useful CO oxidation; and an LNT typically needs to be heated to at least about 150° C. for useful NOx storage and at least about 250° C. for useful regeneration/NOx reduction.

The present catalyst compositions, articles, systems, and methods are suitable for treatment of exhaust gas streams of internal combustion engines, for example, gasoline, hybrid electric, light-duty diesel, and heavy duty diesel engines. The catalyst compositions, articles, and components are also suitable for treatment of emissions from stationary industrial processes, removal of noxious or toxic substances from indoor air, or for catalysis in chemical reaction processes.

EXAMPLES

Aspects of the present disclosure are more fully illustrated by the following examples, which are set forth to illustrate certain aspects of the disclosed subject matter and are not to be construed as limiting thereof. Before describing several exemplary embodiments, it is to be understood that the disclosure is not limited to the details of construction or process steps set forth in the following description, and is capable of other embodiments and of being practiced or being carried out in various ways. Unless otherwise noted, all parts and percentages are by weight, and all weight percentages are expressed on a dry basis, meaning excluding water content, unless otherwise indicated.

Example 1: Compositional and Thermal Screening of Materials

Table 2 provides a series of metal oxide materials. These all fall into the general class of ferrites and related defect spinel structures which have well-documented magnetic properties. Aluminum oxide is included in the list as an inert control material that lacks paramagnetic, ferromagnetic, antiferromagnetic, and ferrimagnetic properties.

TABLE 2

Metal Oxide Materials

| Name | Nominal Composition |
|---|---|
| iron(II, III) oxide | $Fe_3O_4$ |
| barium ferrite | $BaFe_{12}O_{19}$ |
| cobalt ferrite | $CoFe_2O_4$ |
| nickel ferrite | $NiFe_2O_4$ |
| zinc ferrite | $ZnFe_2O_4$ |
| cobalt-zinc ferrite | $Co_{0.5}Zn_{0.5}Fe_2O_4$ |
| nickel-zinc ferrite | $Ni_{0.5}Zn_{0.5}Fe_2O_4$ |
| manganese-zinc ferrite | $Mn_{0.5}Zn_{0.5}Fe_2O_4$ |
| strontium ferrite | $SrFe_{12}O_{19}$ |
| copper ferrite | $CuFe_2O_4$ |
| yttrium iron oxide | $Y_3Fe_5O_{12}$ |
| manganese ferrite | $MnFe_2O_4$ |
| manganese ferrite | $MnFe_2O_4$ |
| nickel-cobalt ferrite | $Ni_{0.5}Co_{0.5}Fe_2O_4$ |
| manganese oxide | $Mn_3O_4$ |
| manganese oxide | $Mn_2O_3$ |

TABLE 2-continued

Metal Oxide Materials

| Name | Nominal Composition |
|---|---|
| manganese oxide | $MnO_2$ |
| aluminum oxide | $Al_2O_3$ |

Figure 7:
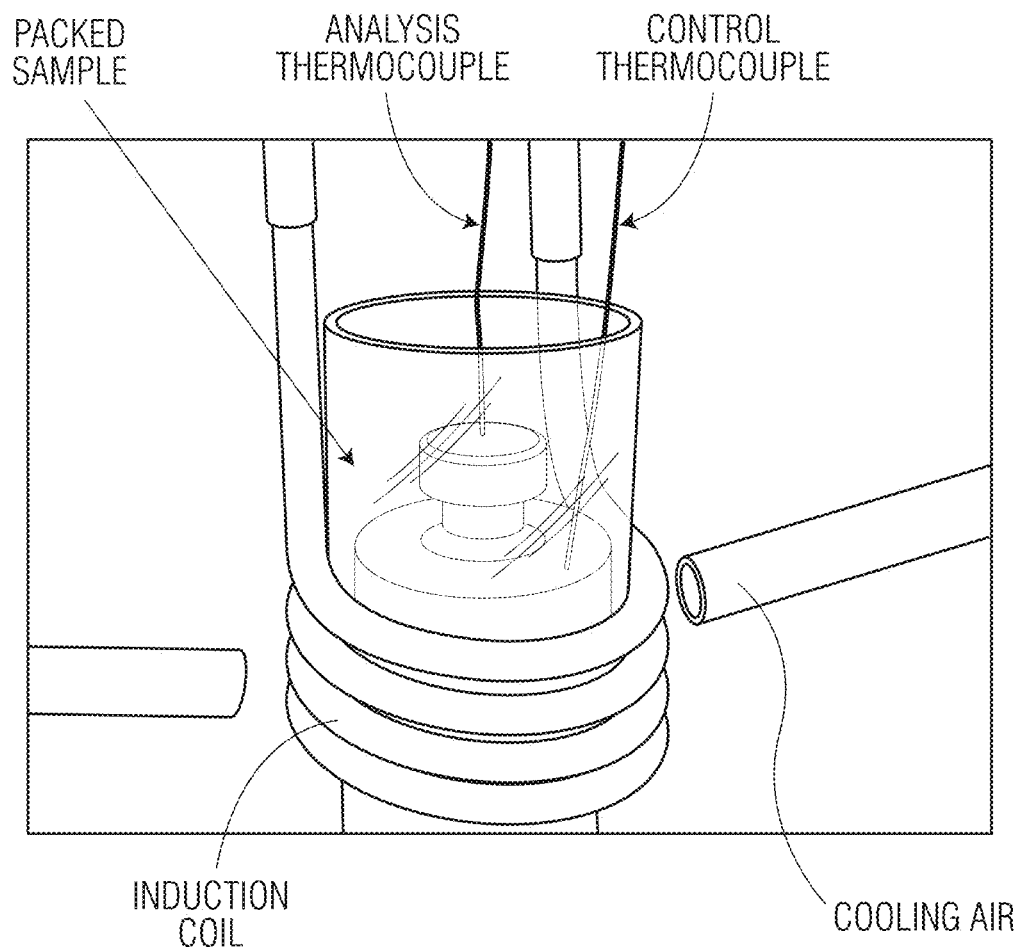
FIG. 7 is a photograph of an experimental setup showing the arrangement of the packed sample, induction coil, and cooling air jets, and the position of the analysis and control thermocouple probes.
Figure 8:
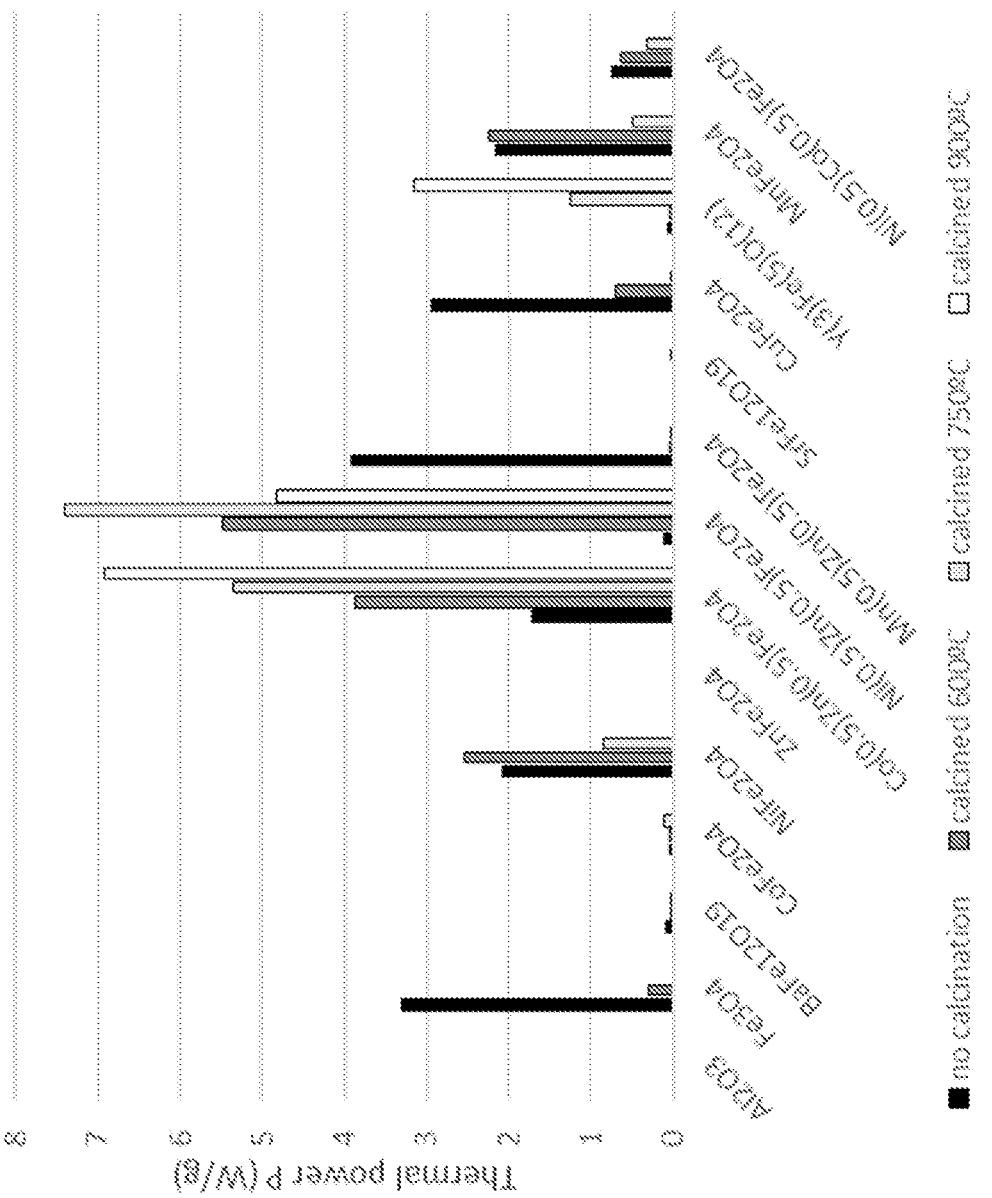
FIG. 8 is a chart showing the thermal power delivery to a system for different metal oxide materials, both reference materials and magnetic ferrite support materials according to embodiments of the disclosure, in both the as-prepared state and after treatment at 600° C., 750° C., and 900° C., measured under exposure to an alternating magnetic field.

Samples of each powder were calcined at 600° C., 750° C., or 900° C. in air. The as-is and calcined powders were evaluated for magnetic induction heating efficiency using a screening apparatus that comprised a sample powder packed in a sampler vial, wrapped in a flexible ceramic tape, and inserted into a 25 mm ID glass tube. The glass tube was mounted in an induction coil. An AC power supply provided alternating current at 50-60 kHz to the induction coil. One temperature probe wire was inserted into the powder bed, and a second temperature probe wire was inserted into the ceramic tape insulation. FIG. 7 shows a photograph of the apparatus used for measurement of induction heating. The temperature reading from the two probes was recorded as a function of time while the alternating current was supplied to the coil. Jets of cooling air minimized resistive heating of the induction coil itself. The average amount of heating power P delivered to the sample in units of W/g was calculated from the initial slope of the temperature vs time profile, DT/Dt, using the relationship $P = C_p \times DT/Dt$ wherein $C_p$ is the heat capacity of the material. FIG. 8 shows that $Fe_3O_4$, $NiFe_2O_4$, $Co_{0.5}Zn_{0.5}Fe_2O_4$, $Mn_{0.5}Zn_{0.5}Fe_2O_4$, $CuFe_2O_4$, and $MnFe_2O_4$ are the only materials that show P>1.0 W/g in the fresh state.

After calcination at 600° C., only $NiFe_2O_4$, $Co_{0.5}Zn_{0.5}Fe_2O_4$, $Ni_{0.5}Zn_{0.5}Fe_2O_4$, and $MnFe_2O_4$ show P>1.0 Wig. The induction heating capability of $Fe_3O_4$, $CuFe_2O_4$, and $Mn_{0.5}Zn_{0.5}Fe_2O_4$ did not survive calcination at 600° C. Significantly, power delivery by $Ni_{0.5}Zn_{0.5}Fe_2O_4$ and $Co_{0.5}Zn_{0.5}Fe_2O_4$ increased appreciably after calcination at 600° C., indicating that these materials are activated for induction by calcination. After calcination at 750° C., the only materials with P>1.0 Wig are $Co_{0.5}Zn_{0.5}Fe_2O_4$, $Ni_{0.5}Zn_{0.5}Fe_2O_4$, and $Y_3Fe_5O_{12}$. The power delivery P for $Co_{0.5}Zn_{0.5}Fe_2O_4$ and $Ni_{0.5}Zn_{0.5}Fe_2O_4$ are still retained after calcination at 900° C., and these are the only materials with P>1.0 after this high-temperature treatment.

Example 2: Effect of Composition on Induction Heating Properties

Figures 9A, 9B:
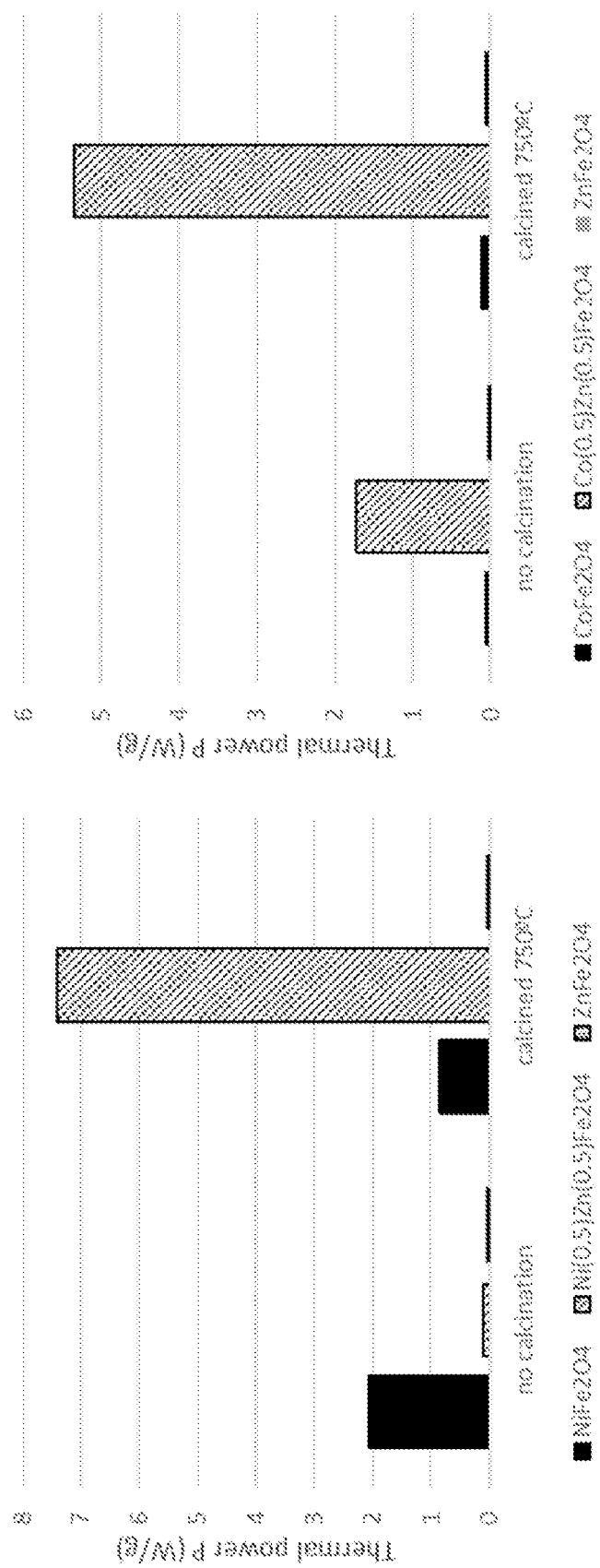
FIG. 9A is a chart showing the thermal power delivery to a system for ferrite metal oxide embodiments of the disclosure having different nickel/zinc molar ratios, in the as-prepared state and after calcination at 750° C., and measured under exposure to an alternating magnetic field.
FIG. 9B is a chart showing the thermal power delivery to a system for ferrite metal oxide embodiments of the disclosure having different cobalt/zinc molar ratios, in the as-prepared state and after calcination at 750° C., and measured under exposure to an alternating magnetic field.

In considering the general material composition $Ni_xZn_{1-x}Fe_2O_4$, then the value of x can range between x=1 (e.g., $NiFe_2O_4$) and x=0 (e.g., $ZnFe_2O_4$). FIG. 9A shows thermal power loss data on $NiFe_2O_4$, $ZnFe_2O_4$, and the mixed ferrite $Ni_{0.5}Zn_{0.5}Fe_2O_4$ (x=0.5). Without calcination, the only material showing effecting power loss to the system is $NiFe_2O_4$ (x=1). Data after calcination at 750° C. show a very different trend, in which the mixed nickel-zinc ferrite material gives a much higher thermal power delivery rate than nickel-only ferrite, $NiFe_2O_4$, or the zinc-only ferrite ($ZnFe_2O_4$). These data indicate that there is a value for x in the composition $Ni_xZn_{1-x}Fe_2O_4$ that leads to the highest power delivery rate when exposed to an alternating magnetic field, and that the optimal value for x is greater than 0 and less than 1.

In the same way, the mixed cobalt-zinc ferrite composition can be considered to have the general formula $Co_xZn_{1-x}Fe_2O_4$, where x can be between x=1 ($CoFe_2O_4$) and x=0 ($ZnFe_2O_4$). FIG. 9B shows thermal power data on $CoFe_2O_4$, $ZnFe_2O_4$, and the mixed ferrite $Co_{0.5}Zn_{0.5}Fe_2O_4$ (x=0.5). In the fresh and aged states, the end members of this series (x=1 and x=0) show almost no thermal response to the alternating magnetic field. By contrast, the mixed cobalt-zinc ferrite material $Co_{0.5}Zn_{0.5}Fe_2O_4$ (x=0.5) shows markedly higher thermal response to the alternating magnetic field. These data indicate that there is a value for x in the composition $Co_xZn_{1-x}Fe_2O_4$ which leads to the maximum thermal response under application of an alternating magnetic field, and that this optimal value for x is greater than 0 and less than 1.

Example 3: Preparation of Pt Supported on $Ni_{0.5}Zn_{0.5}Fe_2O_4$

Powdered $Ni_{0.5}Zn_{0.5}Fe_2O_4$ was calcined at 750° C. for 5 hours in static air in a box furnace. This material is referred to herein as powder 1A. Powder 1A (15 g) was impregnated with platinum at a level of 2.0 wt % Pt. The resulting wet powder was dried at 120° C. for 3 hours and then calcined at 500° C. for 1 hour. This material is referred to herein as Sample 2A. A portion of Samples 1A and 2A was further aged at 750° C. for 5 hours in static air to give Sample 1B and Sample 2B, respectively.

Figure 10:
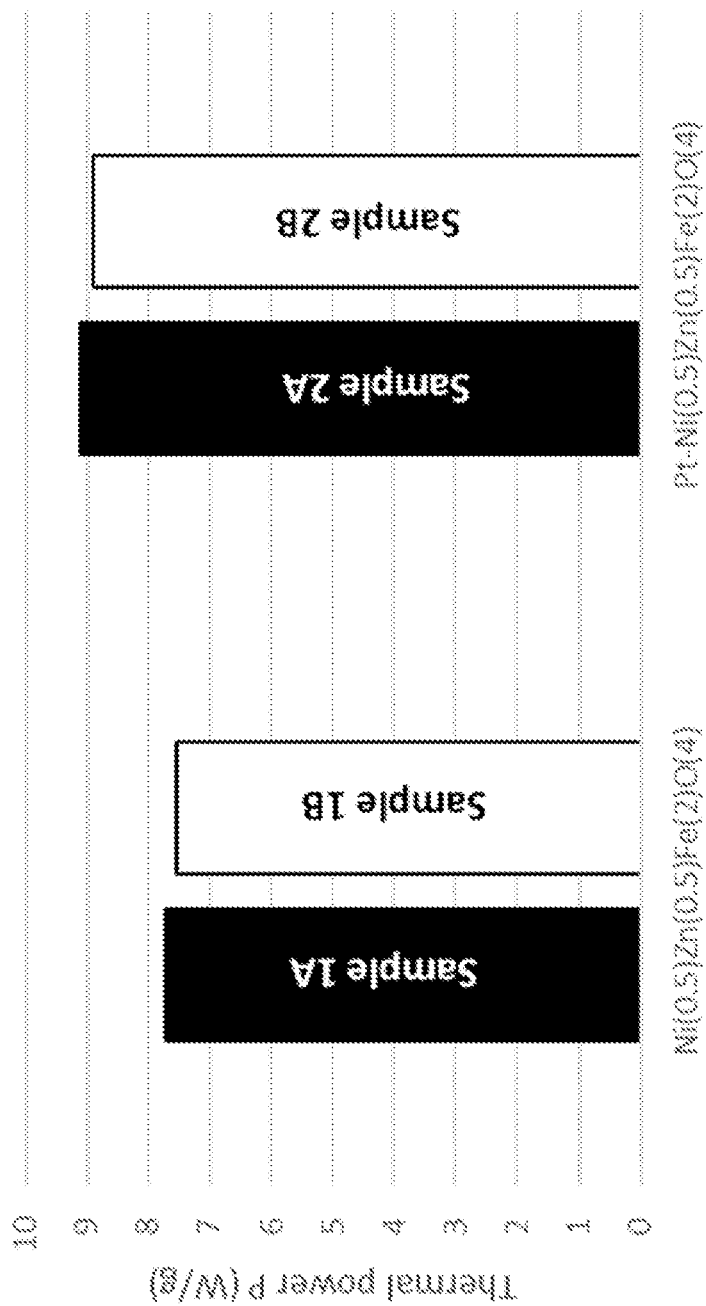
FIG. 10 is a chart showing the thermal power delivery to a system for an embodiment of the disclosure (calcined $Ni_{0.5}Zn_{0.5}Fe_2O_4$), in the native state and after impregnation with Pt, and before and after aging at 750° C.

Samples 1A, 1B, 2A, and 2B were evaluated for their thermal response to an alternating magnetic field as described in Example 1. FIG. 10 shows the thermal power loss for each powder sample. Two important conclusions can be drawn from the results. The first is that addition of Pt did not interfere with the ability of the materials to respond to the alternating magnetic field by releasing heat. The Pt-impregnated materials (2A and 2B) showed as high or higher thermal power loss to the system as did the Pt-free powders (1A and 1B). The second conclusion which can be drawn is that subsequent aging of the powders after the activating pre-calcination step did not result in any degradation of the thermal response to the alternating magnetic field. Sample 1B was nearly equivalent to 1A, and Sample 2B was nearly equivalent to 2A.

Example 4: Evaluation of Pt Supported on Magnetic Oxides for Catalytic $NH_3$ Oxidation About 20 g of $Ni_{0.5}Zn_{0.5}Fe_2O_4$ was impregnated with Pt to a level of 0.6 wt % Pt. The powder was suspended in an amount of deionized water suitable to make a suspension having 30% solids by wt. The pH of the suspension was adjusted to 4.5, and then the resulting suspension was wet-milled for 10 minutes. The slurry was dried, and the resulting powder was calcined at 590° C. for 2 hours in air. The resulting pellet was crushed and sieved to a fraction between 250-500 mm. A portion of the powder was aged at 650° C. for 50 hours in 10% $H_2O$/air to represent a typical accelerated aging employed in screening emission technology for heavy-duty diesel applications. This same preparation procedure was repeated using $NiFe_2O_4$ and $ZnFe_2O_4$ as the support for Pt.

Figure 11:
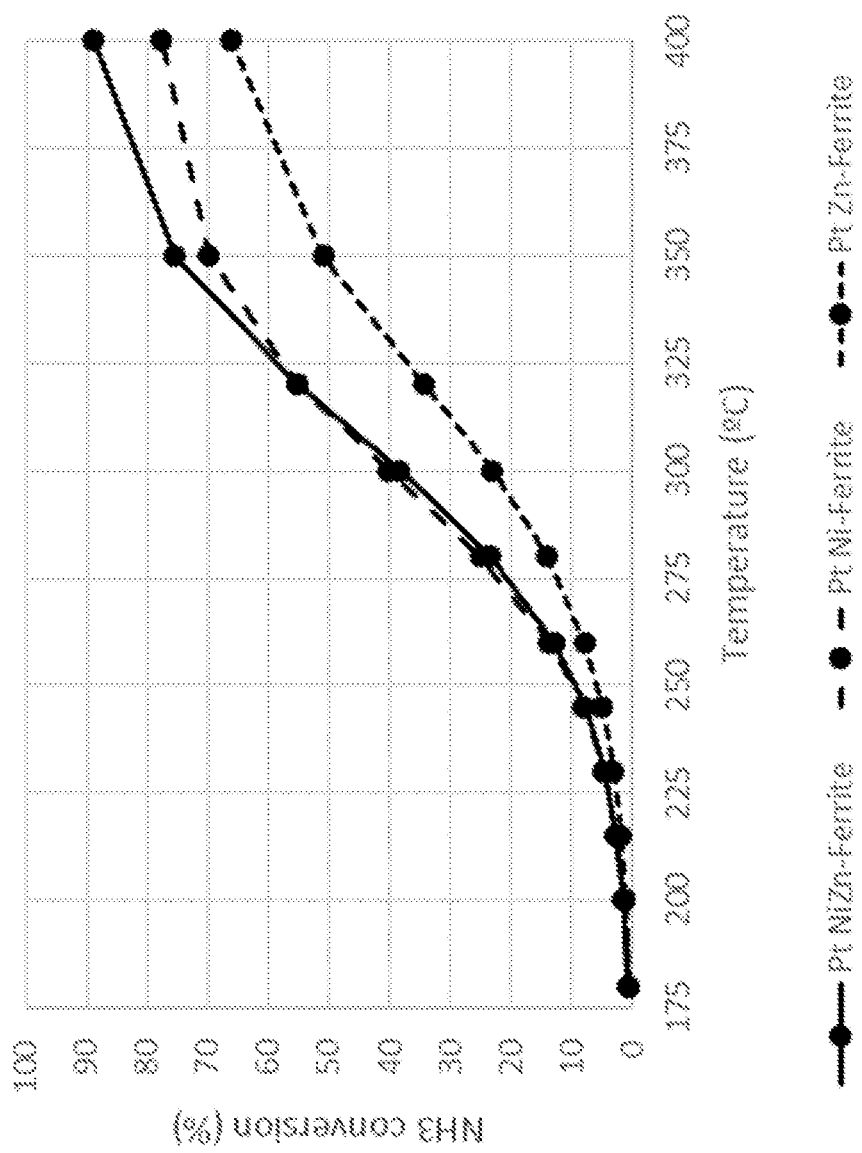
FIG. 11 is a chart showing $NH_3$ conversion activity for embodiments of the disclosure (Pt supported on $Ni_{0.5}Zn_{0.5}Fe_2O_4$, $NiFe_2O_4$, and $ZnFe_2O_4$), as a function of catalyst bed temperature.

The aged catalyst (33 mg) was diluted with corundum to a tap volume of 1.0 $cm^3$. The catalyst was packed into a cylindrical reactor and exposed to a feed consisting of 200 ppm $NH_3$, 6.5 vol. % $H_2O$ vapor, 7.0 vol. % $CO_2$, 10 vol. % $O_2$ and a total gas flow=70 L/hr. The temperature was equilibrated at target points between 180° C. and 400° C. and the steady-state $NH_3$ conversion at each temperature point was recorded. FIG. 11 shows the $NH_3$ light-off profile constructed from the data collected. 0.6% Pt supported on $Ni_{0.5}Zn_{0.5}Fe_2O_4$ and $NiFe_2O_4$ show nearly equivalent $T_{50}$ values of 312° C.; while 0.6% Pt supported on $ZnFe_2O_4$ gave $T_{50}$=350° C. These data suggest that Pt supported on the nickel-containing ferrite materials are more active for $NH_3$ oxidation. However, more broadly these data show that Pt supported on magnetic ferrite compounds can demonstrate catalytic activity of relevance for the function of emission catalysts.

The invention claimed is:

1. A catalyst composition comprising:
   a catalytically active platinum group metal (PGM) component; and
   a magnetic ferrite support material, wherein the magnetic ferrite support material is capable of inductive heating in response to an applied alternating magnetic field, wherein the active platinum group metal is disposed or impregnated on the magnetic ferrite support material,
   wherein the magnetic ferrite support material satisfies at least one of the following:
   (i) the magnetic ferrite support material comprises iron, nickel, and zinc, and wherein a nickel/zinc molar ratio is from 1/99 to 99/1,
   (ii) the magnetic ferrite support material comprises iron, cobalt, and zinc, wherein a cobalt/zinc molar ratio is from 1/99 to 99/1, or
   (iii) the magnetic ferrite support material has the molecular formula $Co_{0.5}Zn_{0.5}Fe_2O_4$, $Ni_{0.5}Zn_{0.5}Fe_2O_4$, or $Y_3Fe_5O_{12}$.

2. The catalyst composition of claim 1, wherein the magnetic ferrite support material comprises one or more elements chosen from zinc, cobalt, nickel, yttrium, manganese, copper, barium, strontium, scandium, and lanthanum.

3. The catalyst composition of claim 1, wherein the magnetic ferrite support material comprises iron and yttrium.

4. The catalyst composition of claim 1, wherein the magnetic ferrite support material is calcined at a temperature of 400° C. to 1200° C. for an hour or more.

5. The catalyst composition of claim 1, wherein the magnetic ferrite support material is in the form of particles having an average particle size from 40 nm to 1 μm.

6. The catalyst composition of claim 1, wherein the catalytically active PGM component is platinum, palladium, rhodium, or a combination thereof.

7. The catalyst composition of claim 1, wherein the magnetic ferrite support material has a Brunauer-Emmett-Teller (BET) surface area of less than 100 m²/g.

8. The catalyst composition of claim 1, wherein a coercivity of the magnetic ferrite support material is from 1 kA/m to 20 kA/m.

9. The catalyst composition of claim 1, configured as a diesel oxidation catalyst (DOC), a catalyzed soot filter (CSF) catalyst, a lean NOx trap (LNT) catalyst, an ammonia oxidation (AMOx) catalyst, or a three-way catalyst (TWC).

10. A catalytic article for treatment of exhaust gas emissions from an internal combustion engine, comprising:
    a substrate in the form of a flow-through substrate or a wall-flow filter, having the catalyst composition of claim 1 deposited thereon,
    the catalytic article adapted for use as a diesel oxidation catalyst (DOC), catalyzed soot filter (CSF), lean NOx trap (LNT), selective catalytic reduction (SCR) catalyst, ammonia oxidation (AMOx) catalyst, or three-way catalyst (TWC).

11. An emission control system comprising:
    the catalytic article of claim 10;
    a conductor for receiving current and generating an alternating magnetic field in response thereto, the conductor positioned such that the generated alternating magnetic field is applied to at least a portion of the catalyst composition;
    an electric power source electrically connected to the conductor for supplying alternating current thereto;
    a temperature sensor positioned to measure a temperature of gases entering the catalytic article; and
    a controller in communication with the temperature sensor, the controller adapted for control of the current supplied to the conductor, such that the controller energizes the conductor with current when heating of the catalytic article is desired.

12. A method of treating exhaust gas emissions from an internal combustion engine, comprising passing the exhaust gas emissions through the emission control system of claim 11, wherein the internal combustion engine is a gasoline engine, diesel engine, hybrid electric, or natural gas engine.

13. A catalyst for fixed bed reactor design comprising a catalyst bed having the catalyst composition of claim 1.

14. A fixed bed catalyst system comprising:
    the catalyst of claim 13; and
    a conductor for receiving current and generating an alternating magnetic field in response thereto, the conductor positioned such that the generated alternating magnetic field is applied to at least a portion of the catalyst composition.

15. A method for producing the catalyst composition of claim 1, the method comprising:
    heating the magnetic ferrite support material at a temperature of 600° C. or greater for an hour or more; and
    combining the heated magnetic ferrite support material with the catalytic material.

* * * * *